United States Patent
Hata et al.

(10) Patent No.: US 12,553,719 B2
(45) Date of Patent: Feb. 17, 2026

(54) METHODS AND APPARATUSES FOR ENABLING DETERMINATION OF A POSITION OF A MOBILE DEVICE IN AN ENVIRONMENT

(71) Applicant: Telefonaktiebolaget LM Ericsson (publ), Stockholm (SE)

(72) Inventors: Alberto Hata, Campinas (BR); Jean Paulo Martins, Indaiatuba (BR); Klaus Raizer, Indaiatuba (BR); Amadeu Do Nascimento Junior, Indaiatuba (BR)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 104 days.

(21) Appl. No.: 18/578,517

(22) PCT Filed: Jul. 14, 2021

(86) PCT No.: PCT/SE2021/050725
§ 371 (c)(1),
(2) Date: Jan. 11, 2024

(87) PCT Pub. No.: WO2023/287330
PCT Pub. Date: Jan. 19, 2023

(65) Prior Publication Data
US 2024/0310172 A1    Sep. 19, 2024

(51) Int. Cl.
*G01C 21/00*    (2006.01)
*G06T 7/73*    (2017.01)

(52) U.S. Cl.
CPC ........ *G01C 21/005* (2013.01); *G01C 21/3811* (2020.08); *G06T 7/74* (2017.01);
(Continued)

(58) Field of Classification Search
CPC ..... G01C 21/005; G01C 21/3811; G06T 7/74; G06T 7/579; G06T 2207/20081;
(Continued)

(56) References Cited

U.S. PATENT DOCUMENTS

2019/0259182 A1*  8/2019  Sarukkai ............... G06T 7/97
2020/0051252 A1*  2/2020  Brown ................ G05D 1/0088
(Continued)

OTHER PUBLICATIONS

Feng et al, Y. Effective venue image retrieval using robust feature extraction and model constrained matching for mobile robot llocalization, Google Scholar, Machine Vision and Applications, vol. 23, Jun. 2011, pp. 1011-1027. (Year: 2011).*
(Continued)

*Primary Examiner* — Russell Frejd
(74) *Attorney, Agent, or Firm* — Weisberg I.P. Law, P.A.

(57) ABSTRACT

A method in a contrastive learning node includes obtaining a set of landmark feature images representing a set of landmark features in the environment; obtaining a first feature image derived from a first image captured by the mobile device; determining, using a contrastive learning model, whether the first feature image is similar to any of the set of landmark feature images, wherein the contrastive learning model is trained based on a first set of feature images; responsive to determining that a landmark feature image is similar to the first feature image, initiating determination of a position of the mobile device; and responsive to determining that none of the set of landmark features images are similar to the first feature image, retraining the contrastive learning model based on an updated set of feature images comprising the first feature image.

12 Claims, 22 Drawing Sheets

(52) U.S. Cl.
CPC ............... *G06T 2207/20081* (2013.01); *G06T 2207/20084* (2013.01)

(58) Field of Classification Search
CPC . G06T 2207/20084; G06T 2207/10016; G06T 2207/20072; G06T 2207/20076; G06V 10/751; G06V 10/82
See application file for complete search history.

(56) References Cited

U.S. PATENT DOCUMENTS

2020/0250850 A1    8/2020    Chakravarty et al.
2021/0118185 A1*    4/2021    Sarukkai ................. G06N 3/08

OTHER PUBLICATIONS

Talluri et al, R. Mobile Robot Self-Location Using Model-Image Feature Correspondence, Google Scholar, IEEE Transactions on Robotics and Automation, vol. 12, No. 1, Feb. 1996, pp. 63-77. (Year: 1996).*

Leyva-Vallina et al, M. Generalized Contrastive Optimization of Siamese Networks for Place Recognition, Google Scholar, Computer Science, Computer Vision and Pattern Recognition, Mar. 2021, pp. 1-23. (Year: 2021).*

International Search Report and Written Opinion dated Apr. 20, 2022 for International Application No. PCT/SE2021/050725 filed Jul. 14, 2021, consisting of 13-pages.

T. Chen et al.; A Simple Framework for Contrastive Learning of Visual Representations; arXiv; Jul. 1, 2020, consisting of 20-pages.

Wikipedia contributors. "Edge detection." Wikipedia, The Free Encyclopedia. Wikipedia Oct. 13, 2023; Retrieved from Internet Dec. 8, 2023; Last edited on Dec. 3, 2020; consisting of 9-pages.

J. Hou et al.; Area Graph: Generation of Topological Maps using the Voronoi Diagram; arXiv; Oct. 1, 2019; consisting of 7-pages.

D. Li et al.; Graph Attention Memory for Visual Navigation; arXiv; Jun. 4, 2019; consisting of 13-pages.

T. Barros et al.; Place recognition survey: An update on deep learning approaches; arXiv; Jun. 22, 2021; consisting of 18-pages.

D.S. Chaplot et al.; Neural Topological SLAM for Visual Navigation; arXiv; May 28, 2020; consisting of 14-pages.

G. Koch et al.; Siamese Neural Networks for One-shot Image Recognition; Proceedings of the 32nd International Conference on Machine Learning, vol. 37; 2015, consisting of 8-pages.

F. Blöchliger et al.; Topomap: Topological Mapping and Navigation Based on Visual SLAM Maps; arXiv; Mar. 9, 2018, consisting of 8-pages.

A. Angeli et al.; Incremental vision-based topological SLAM; 2008 IEEE/RSJ International Conference on Intelligent Robots and Systems; Sep. 22, 2008; consisting of 6 pages.

* cited by examiner

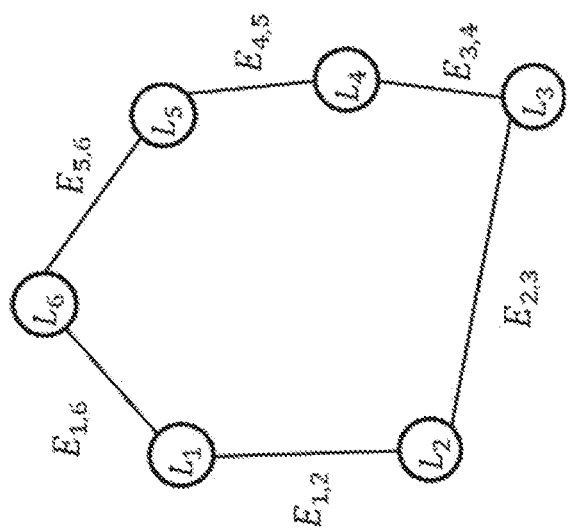
Figure 5c
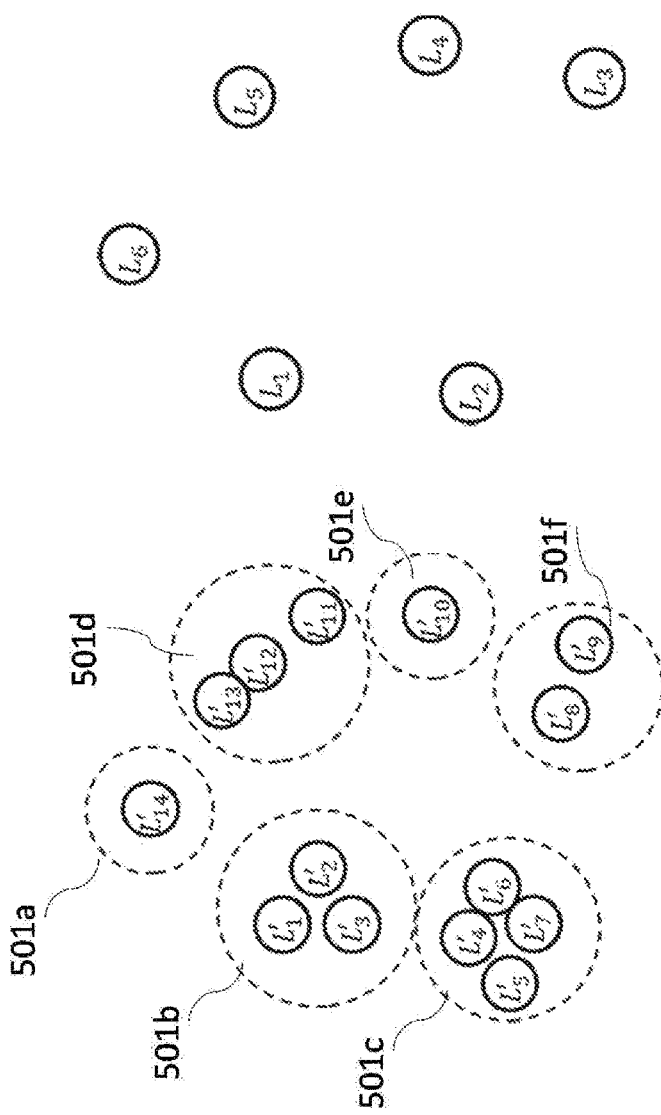
Figure 5b
Figure 5a

METHODS AND APPARATUSES FOR ENABLING DETERMINATION OF A POSITION OF A MOBILE DEVICE IN AN ENVIRONMENT

CROSS-REFERENCE TO RELATED APPLICATION

This application is a Submission Under 35 U.S.C. § 371 for U.S. National Stage Patent Application of International Application Number: PCT/SE2021/050725, filed Jul. 14, 2021 entitled "METHODS AND APPARATUSES FOR ENABLING DETERMINATION OF A POSITION OF A MOBILE DEVICE IN AN ENVIRONMENT," the entirety of which is incorporated herein by reference.

TECHNICAL FIELD

Embodiments described herein relate to methods and apparatuses for enabling determination of a position of a mobile device in an environment. In particular, methods and apparatuses described herein may utilize contrastive learning both to determine the position of the mobile device and to update and maintain a topological map used to determine the position of the mobile device.

BACKGROUND

Localization is one of the main elements required to enable autonomous operation of mobile devices (e.g., automatic guided vehicle (AGVs), mobile robots, etc.) inside environments (e.g. factories). For example, the localization of a mobile device may be obtained by using a wheel encoder, Ultra-Wideband (UWB), or Global Navigation Satellite System (GNSS) devices. However, these solutions can accumulate errors over time, be costly to implement, or be impractical to use in indoor spaces. Alternatively, a widely used solution is map-based localization, where a digital map of the environment is created, then sensor measurements are matched to this digital map to calculate the most probable position of the mobile device.

Commonly, two types of maps are used: metric and topological. The former represents geometric information of the environment and delivers an accurate localization. The latter represents semantic information and returns a less accurate localization, as a sparser representation is employed. However, in general, topological maps require less storage space and demand lower processing power during localization. Consequently, mapping and localization processes using topological maps are more suitable for devices with computing constrained hardware. In addition, topological maps may be chosen for mobile device localization when an approximate estimation of the position is allowed.

Traditionally, topological maps are built by extracting structural information from metric maps through a Voronoi diagram or another technique. This approach is limited to extract specific types of landmarks, such as corridors, rooms, and doors. Consequently, it might not be suitable to map environments such as inside factories or warehouses, which have other types of landmarks (e.g. machinery, chairs, tables, etc.). Furthermore, as the mapping process relies on a metric map, it is necessary for another mapping method to initially create the metric map. In general, the topological map should also be regenerated after a change occurs in the environment. However, existing techniques rely on a manual intervention to decide whether a change happened and to update the map accordingly.

After building the topological map, localization may be performed to determine the most likely landmark that the mobile device is located at. For that, the localization process makes use of computer vision methods to detect these landmarks. Depending on the semantic information contained in the landmark, complex object detection methods may be required, which might lead to an increase in the processing cost.

Generally, in a topological map, the creation or update of the map and the localization steps are not linked. This means that new landmarks are not added to the map during the localization in most solutions. Some solutions do perform the topological mapping and localization simultaneously, which is also referred to as topological SLAM. In this approach, the topological map is updated when unforeseen landmarks are detected. In this process, methods to detect new information are employed, such as Bayesian surprise. However, this landmark detection requires a separate process (such as Bayesian surprise), which can add additional workload to the mobile device.

There are existing works that address the use of topological SLAM. For example, the disclosure in Chaplot, Devendra Singh, et al. "*Neural Topological SLAM for Visual Navigation*". arXiv:2005.12256 [cs], arXiv.org, http://arxiv.org/abs/2005.12256, makes use of deep neural network (DNN) to find similar places in an environment. However, this document uses a complex network architecture to solve the problem, which may not be possible to run on robots with limited computing capacity. In addition, a large training dataset is required as it relies on a complex DNN. Other works, such as, Blöchliger, Fabian, et al. "*Topomap: Topological Mapping and Navigation Based on Visual SLAM Maps*". arXiv: 1709.05533 [cs] arXiv.org, http://arxiv.org/abs/1709.05533, depend on an existing geometric representation of the environment to build the topological map, which might not be always available. In addition, this requires a prior step of generating a geometric map, which adds complexity to the mapping solution.

SUMMARY

According to some embodiments there is provided a computer-implemented method for enabling determination of a position of a mobile device in an environment. The method comprises obtaining a set of landmark feature images representing a set of landmark features in the environment, wherein the set of landmark features images are for use in determining positions of wireless devices in the environment; obtaining a first feature image derived from a first image captured by the mobile device; determining, using a contrastive learning model, whether the first feature image is similar to any of the set of landmark feature images, wherein the contrastive learning model is trained based on a first set of feature images; responsive to determining that a landmark feature image is similar to the first feature image, initiating determination of a position of the mobile device; and responsive to determining that none of the set of landmark features images are similar to the first feature image, retraining the contrastive learning model based on an updated set of feature images comprising the first feature image According to some embodiments there is provided a computer-implemented method for enabling determination of a position of a mobile device in an environment. The method comprises obtaining a set of landmark feature images for use in determining positions of wireless devices in the environment, wherein the set of landmark feature images are obtained using a contrastive learning model trained based on a first set of feature images; responsive to obtaining an indication that none of the set of landmark features images are similar to a first feature image derived from a first image captured by the mobile device, initiating retraining of the contrastive learning model based on an updated set of feature images comprising the first feature image.

According to some embodiments there is provided a computer-implemented method for enabling determination of a position of a mobile device in an environment. The method comprises obtaining a first feature image derived from a first image captured by the mobile device; obtaining an indication of whether the first feature image is similar to any of a set of landmark feature images, wherein the landmark feature images are for use in determining positions of wireless devices in the environment and wherein the landmark feature images represent a set of landmark features in the environment, and wherein the indication is determined using a contrastive learning model trained based on a first set of feature images; responsive to the indication indicating that a landmark feature image is similar to the first feature image, determining the position of the mobile device; and responsive to the indication indicating that none of the set of landmark features images are similar to the first feature image, initiating retraining of the contrastive learning model based on an updated set of feature images comprising the first feature image.

According to some embodiments there is provided a contrastive learning node for enabling determination of a position of a mobile device in an environment. The contrastive learning node comprises processing circuitry configured to cause the contrastive learning node to: obtaining a set of landmark feature images representing a set of landmark features in the environment, wherein the set of landmark features images are for use in determining positions of wireless devices in the environment; obtain a first feature image derived from a first image captured by the mobile device; determine, using a contrastive learning model, whether the first feature image is similar to any of the set of landmark feature images, wherein the contrastive learning model is trained based on a first set of feature images; responsive to determining that a landmark feature image is similar to the first feature image, initiate determination of a position of the mobile device; and responsive to determining that none of the set of landmark features images are similar to the first feature image, retrain the contrastive learning model based on an updated set of feature images comprising the first feature image.

According to some embodiments there is provided a mapping node for enabling determination of a position of a mobile device in an environment. The mapping node comprises processing circuitry configured to cause the mapping node to obtain a set of landmark feature images for use in determining positions of wireless devices in the environment, wherein the set of landmark feature images are obtained using a contrastive learning model trained based on a first set of feature images; responsive to obtaining an indication that none of the set of landmark features images are similar to a first feature image derived from a first image captured by the mobile device, initiate retraining of the contrastive learning model based on an updated set of feature images comprising the first feature image.

According to some embodiments there is provided a localization node for enabling determination of a position of a mobile device in an environment. The localization node comprises processing circuitry configured to cause the localization node to obtain a first feature image derived from a first image captured by the mobile device; obtain an indication of whether the first feature image is similar to any of a set of landmark feature images, wherein the landmark feature images are for use in determining positions of wireless devices in the environment and wherein the landmark feature images represent a set of landmark features in the environment, and wherein the indication is determined using a contrastive learning model trained based on a first set of feature images; responsive to the indication indicating that a landmark feature image is similar to the first feature image, determine the position of the mobile device; and responsive to the indication indicating that none of the set of landmark features images are similar to the first feature image, initiate retraining of the contrastive learning model based on an updated set of feature images comprising the first feature image.

BRIEF DESCRIPTION OF THE DRAWINGS

For a better understanding of the embodiments of the present disclosure, and to show how it may be put into effect, reference will now be made, by way of example only, to the accompanying drawings, in which:

FIGS. 5a to 5c illustrate an example of a clustering process;

DESCRIPTION

Figure 1:
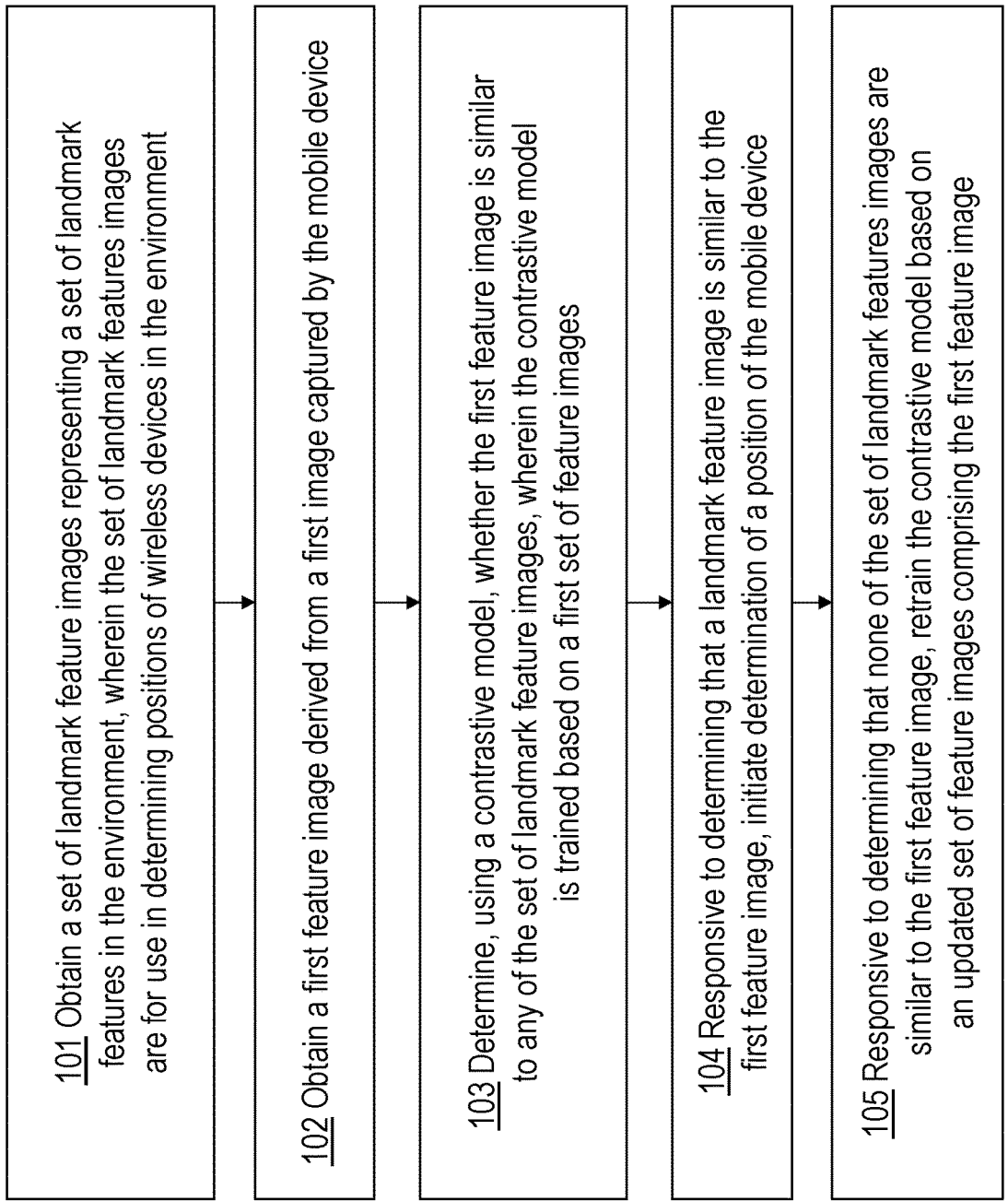
FIG. 1 illustrates a method for enabling determination of a position of a mobile device in an environment.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAS, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Embodiments described herein provided a topological simultaneous localization and mapping (SLAM) solution supported by contrastive learning. This learning technique is commonly applied in the computer vision field as a low processing cost solution to determine the similarity between a pair of images. In embodiments described herein, contrastive learning is used to support, in conjunction, both the mapping and the localization steps. Thanks to contrastive learning's ability to detect novel information, new landmarks may be automatically identified during the mapping step. The same approach is applied for the localization step, in which the similarity analysis is performed to determine the estimated location of a mobile device.

Embodiments described herein may be considered to comprise two parts: (i) topological mapping and (ii) localization and update of the topological map. In (i), landmarks are automatically detected to create the topological map. While in (ii), localization is performed by computing the similarity between a sensor measurement and the landmarks registered in the topological map. If during the localization a similar landmark is not found, the method recognizes that novel information was detected. Consequently, a regeneration of the topological map may be triggered, and in some cases a new landmark is added to the topological map.

A novel contrastive learning architecture based on a Siamese network is also proposed. In contrast to a typical Siamese network, the new contrastive learning architecture may perform multiple similarity analyses in a single inference. In addition, the complexity of the inference is constant independent of the number of landmarks in the topological map, which enables the usage of the embodiments described herein in resource-constrained devices.

Embodiments described herein will be described as being performed by three nodes: a mapping node, a contrastive learning node, and a localization node. However, it will be appreciated that in some embodiments, the functionality of one or more these nodes may be co-located. Therefore, it will be appreciated that steps described herein as being performed by a particular node, may in some embodiments be implemented by one or both of the other nodes.

FIG. 1 illustrates a method for enabling determination of a position of a mobile device in an environment. It will be appreciated that the environment may comprise any suitable environment, either indoors or outdoors (e.g. a factory, football stadium, etc.). It will also be appreciated that the mobile device may comprise any suitable type of mobile device, for example a drone, a mobile robot or an automated guided vehicle (AGV).

The method may be performed by a contrastive learning node. The contrastive learning node may comprise a physical or virtual node, and may be implemented in a computing device or server apparatus and/or in a virtualized environment, for example in a cloud, edge cloud or fog deployment. In some examples, the contrastive learning node may be implemented in the mobile device.

In step 101 the method comprises obtaining a set of landmark feature images representing a set of landmark features in the environment, wherein the set of landmark features images are for use in determining positions of wireless devices in the environment. The set of landmark features may be obtained at a mapping node during a mapping process by using a contrastive learning model in the contrastive learning node. In some examples, the set of landmark feature images may be received at the contrastive learning node from a mapping node. The mapping node may derive the landmark feature images during a mapping process (as will be described with more detail with reference to FIGS. 4)

In step 102 the method comprises obtaining a first feature image derived from a first image captured by the mobile device. In some examples, a mapping node may derive the feature image from a first feature image by determining a binary version of the feature image, and may transmit the first feature image to the contrastive learning node.

In step 103, the method comprises determining, using the contrastive learning model, whether the first feature image is similar to any of the set of landmark feature images, wherein the contrastive learning model is trained based on a first set of feature images.

This determination is performed as part of a localisation process to determine the position of the wireless device. Therefore, it will be appreciated that the contrastive learning model is used both to help determine the set of landmark features, and to help determine the position of the wireless device.

In step 104, the method comprises, responsive to determining that a landmark feature image is similar to the first feature image, initiating determination of a position of the mobile device. For example, the contrastive learning node may initiate determination of the position of the mobile device by transmitting, to a localisation node, an indication of similarity values indicating the similarity of the first feature image to each of the set of landmark feature images. The localisation node may determine, based on the similarity values, the position of the mobile device.

In step 105, the method comprises, responsive to determining that none of the set of landmark features images are similar to the first feature image, retraining the contrastive learning model based on an updated set of feature images comprising the first feature image. In other words, the contrastive learning node may retrain the contrastive learning model as part of a process to update the set of landmark features (e.g. to update a topological map).

Figure 2:
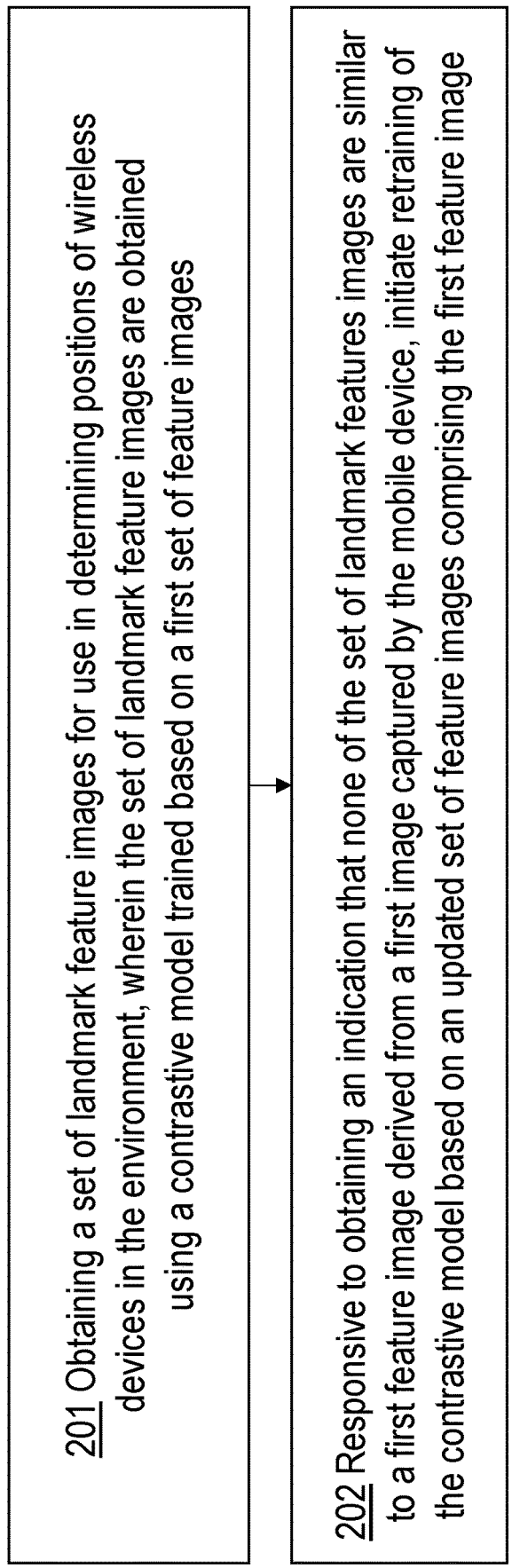
FIG. 2 illustrates a method for enabling determination of a position of a mobile device in an environment.

FIG. 2 illustrates a method for enabling determination of a position of a mobile device in an environment. The method of FIG. 2 may be performed by a mapping node. The mapping node may comprise a physical or virtual node, and may be implemented in a computing device or server apparatus and/or in a virtualized environment, for example in a cloud, edge cloud or fog deployment. In some examples, the mapping node may be implemented in the mobile device.

In step 201, the method comprises obtaining a set of landmark feature images for use in determining positions of wireless devices in the environment, wherein the set of landmark feature images are obtained using a contrastive learning model trained based on a first set of feature images. In particular, the contrastive learning model may be utilized to determine novelty levels for the first set of feature images. The mapping node may then determine the set of landmark feature images based on the novelty levels.

In step 202, the method comprises, responsive to obtaining an indication that, based on the contrastive learning model, none of the set of landmark features images are similar to a first feature image derived from a first image captured by the mobile device, initiating retraining of the contrastive learning model based on an updated set of feature images comprising the first feature image. For example, the indication may comprise receiving the first feature image from a localization node, and step of initiating retraining of the contrastive learning model may comprise transmitting the first feature image to the mapping node.

Figure 3:
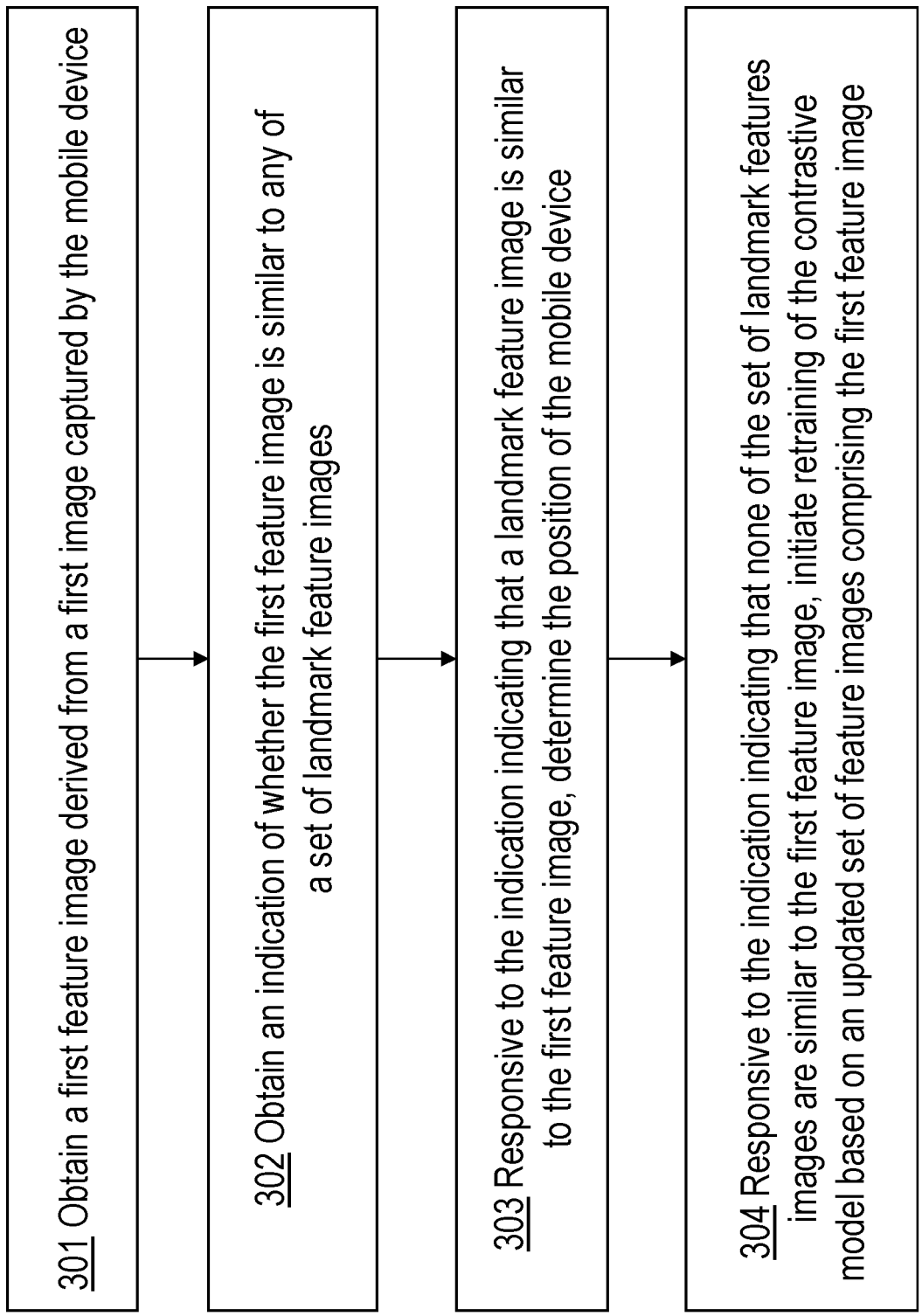
FIG. 3 illustrates a method for enabling determination of a position of a mobile device in an environment.

FIG. 3 illustrates a method for enabling determination of a position of a mobile device in an environment. The method of FIG. 3 may be performed by a localization node. The localization node may comprise a physical or virtual node, and may be implemented in a computing device or server apparatus and/or in a virtualized environment, for example in a cloud, edge cloud or fog deployment. In some examples, the localization node may be implemented in the mobile device.

In step 301 the method comprises obtaining a first feature image derived from a first image captured by the mobile device. For example, the mapping node may receive the first image from the mobile device.

In step 302 the method comprises obtaining an indication of whether the first feature image is similar to any of a set of landmark feature images, wherein the landmark feature images are for use in determining positions of wireless devices in the environment and wherein the landmark feature images represent a set of landmark features in the environment, and wherein the indication is determined using a contrastive learning model trained based on a first set of feature images.

In step 303 the method comprises responsive to the indication indicating that a landmark feature image is similar to the first feature image, determining the position of the mobile device.

In step 304 the method comprises responsive to the indication indicating that none of the set of landmark features images are similar to the first feature image, initiating retraining of the contrastive learning model based on an updated set of feature images comprising the first feature image. For example, the step of initiating retraining of the contrastive learning model may comprise transmitting the first feature image to the mapping node.

It will be appreciated therefore that the methods described above with reference to FIGS. 1 to 3 provide an initial set of landmark feature images that are determined using a contrastive learning model. After building the initial topological map (containing the initial set of landmark feature images), the landmarks may then be successively updated during a localization process using the same contrastive learning model.

It will also be appreciated that it may be possible to deal with dynamic objects within the environment by combining the embodiments described herein with object tracking methods to remove moving obstacles.

Figure 4:
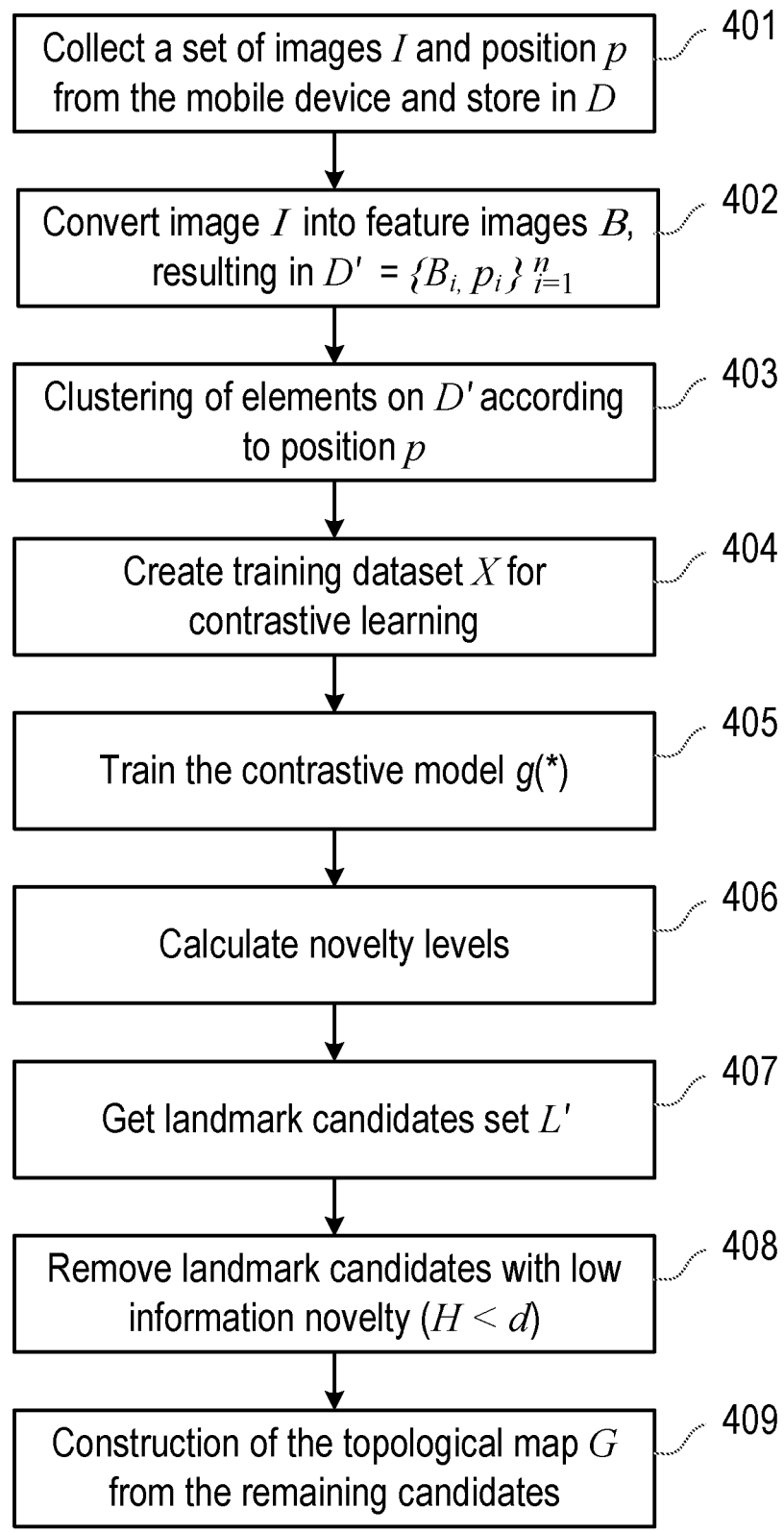
FIG. 4 illustrates a mapping process according to some embodiments.

FIG. 4 illustrates a mapping process according to some embodiments.

Topological maps may be represented in graph format G(V, E), where the nodes y denote relevant locations (i.e., landmarks) and edges E denote the connection between these nodes. A topological map may comprise a set of landmarks $V=\{L_i\}_{i=1}^m$, where m≤n is the number of landmarks in this map. Each landmark may be denoted as $L_i=\{B_i, p_i\}$. In other words, each landmark may comprise the landmark feature image and its corresponding position.

In step 401 the method comprises collecting camera data through the random exploration of the environment by a mobile device. In other words, the mapping node may collect a first set of images from the mobile device. This step may be performed by teleoperating the mobile device or using a wall follower or another naïve navigation strategy.

During this process, images I are gathered at some frequency along with the position p of the mobile device. The position of the mobile device may comprise both the location and the orientation of the mobile device within the environment.

This results in the data set $D=\{I_i, p_i\}_{i=1}^n$, where x is the number of collected pairs of images and with their respective position data. At this stage, p may be obtained through devices that provide the position of the mobile device, such as wheel odometry, Ultra-Wideband (UWB), Inertial Measurement Units (IMU) or Global navigation satellite system (GNSS) (if available).

In step 402, the method comprises converting the images into feature images. A feature image may comprise a binary image of the original image. In other words, the feature image may be derived from an image using a function $f:I \rightarrow B$. This function may be any shape detector, such as an edge, line, or corner detector. Step 402 may therefore result in the data set $D'=\{B_i, p_i\}_{i=1}^n$. The data set D' may be used to construct a topological map G.

In step 403 the method comprises clustering the feature images in the first set of feature images according to the respective positions of each of the first set of feature images. For example, the elements of D' are grouped according to the position $p_i$ using, for example, a k-means function or a similar method. The number of clusters c, where $c \in \mathbb{Z}_+$ and $c \leq n$, may be manually provided or may be generated automatically by the clustering method. A unique identifier from $K=\{k_i\}_{i=1}^c$, may then be assigned to each cluster. This process results in an extension to the data set D' such that $D'=\{B_i, p_i, t_i\}_{i=1}^n$, where $t \in K$. An example of a clustering process is illustrated in FIG. 5(a).

In FIG. 5a for example, the feature images $L'_1$ to $L'_{14}$ are illustrated. In this example, step 403 clusters these feature images into 6 clusters, 501a to 501f. As can be seen the clustering process clusters together feature images that are positioned close together.

In step 404, the method comprises generating a training data set X for the contrastive learning model. The training dataset may be given by $X=\{x_i, x'_i, y_i\}_{i=1}^u$. Each entry in the training data set may comprise a unique pair of feature images $\{x, x'\}$ from the data set D'. Pairs may be formed by randomly selecting (with replacement) images $B \in D'$. Each entry in the dataset may also comprise a corresponding target label $y \in \{0,1\}$. Pairs of feature images that are associated with the same cluster identifier k are given a target label of y=1 and those that are associated with different cluster identifiers are given a target label of y=0.

It is appreciated that there will be differences between images within the same cluster. However, for better robustness, data augmentation techniques, such as rotation, cropping, skewing, and shearing, may be applied to the feature images in order to introduce variability in the images of the same cluster.

In step 405, the method comprises training a contrastive learning model, g(.). In particular, the training data set X may be used to train the contrastive learning model. In some example, part of the training data set X may be reserved for model testing. The contrastive learning model may be trained such that it outputs a similarity value indicating a similarity between a pair of feature images. In particular, the contrastive learning model may be trained such that it is more likely to output that a pair of feature images are similar if the pair of feature images are indicated as being in the same cluster.

At this stage, the trained contrastive learning model may be denoted as $g(a, b) \rightarrow [0,1]$. In other words, the model predicts the similarity between a pair of feature images (a, b). Similar images result in values close to 1, and different images lead to values near 0.

In step 406 the method comprises for each feature image in the first set of feature images, calculating a novelty level for the feature image based on the similarity values output by the contrastive learning model. For example, the first set of feature images $\{B_i\}_{i=1}^n \in D'$ may be fed into the contrastive learning model g(a, b), and a set of similarity values for each unique pair of feature images is obtained. For each image $B_i$ a novelty level, $H_i$ may be calculated as a sum of the similarity values with respect to all other feature images in the first set of feature images. For example:

$$H_i = 1 - \sum_{j=1, j \neq i}^{n} g(B_i, B_j)/(n-1).$$

The novelty level $H_i$ represents the level of new information that the image $B_i$ has over the images in D'. In other words, the novelty level indicates the dissimilarity of the feature image to all other feature images in the first set of feature images. Values of H closer to 1 indicate that the image B; has more novel information. It will be appreciated that there may be other ways of assessing the novelty level of a particular feature image. For example, a novelty level value may be produced in which lower values indicate a higher level of novelty. The novelty values may be appended to D', such that $D'=\{B_i, H_i, p_i, t_i\}_{i=1}^n$.

In step 407, the method comprises selecting a set of landmark feature images L'. In particular, step 407 may comprise selecting the set of landmark feature images by: for each cluster in the first set of feature images, selecting one landmark feature image based on the novelty levels of feature images in the cluster. For example, for each cluster $(k_i)_{i=1}^c$, the most representative feature image B may be selected. The most representative feature image may be the feature image associated with the highest value of H in each cluster. If two features images in a cluster have the same novelty level, then either image may be selected. The selected landmark feature images may then be stored in a set $\{L'_i\}_{i=1}^c$, where $L'_i=\{B_i, H_i, p_i, t_i\}$.

In step 408 the method comprises responsive to a first novelty level of a first landmark feature not meeting a predetermined criteria, removing the landmark feature image from the set of landmark feature images. For example, the elements from $(L'_i)_{i=1}^c$ that have a novelty level $H_i$ below a certain threshold value d may be removed from the set of landmark feature images. The value of d may be obtained in an empirical manner or using some optimization technique (d may be set with a value near 0, for example d=0.1). Step 408 may therefore produce the set of landmark feature images $\{L_i\}_{i=1}^m$, where $L_i=\{B_i, p_i\}$ and $m \leq c$.

FIG. 5(b) illustrates the set of landmarks obtained after this process. In FIG. 5b it can be seen that a landmark feature image has been selected from each cluster illustrated in FIG. 5a.

In step 409 the method comprises constructing a topological map G(V, E) from the set of landmark feature images. For example, the resulting set of landmark feature images $\{L_i\}_{i=1}^m$ may be assigned to the map vertices v. The connection between the vertices may be given by E, and may be determined by performing a traversability analysis on D. The topological graph G{V, E} may then be fed into graph optimization such as g2o (general graph optimization) and/or TORO (Tree-Based Network Optimizer) in order to optimize and adjust the position of the vertices. The resulting vertices and edges are used to build the map G(V, E).

FIG. 5(c) illustrates an example of a topological map.

Figure 6:
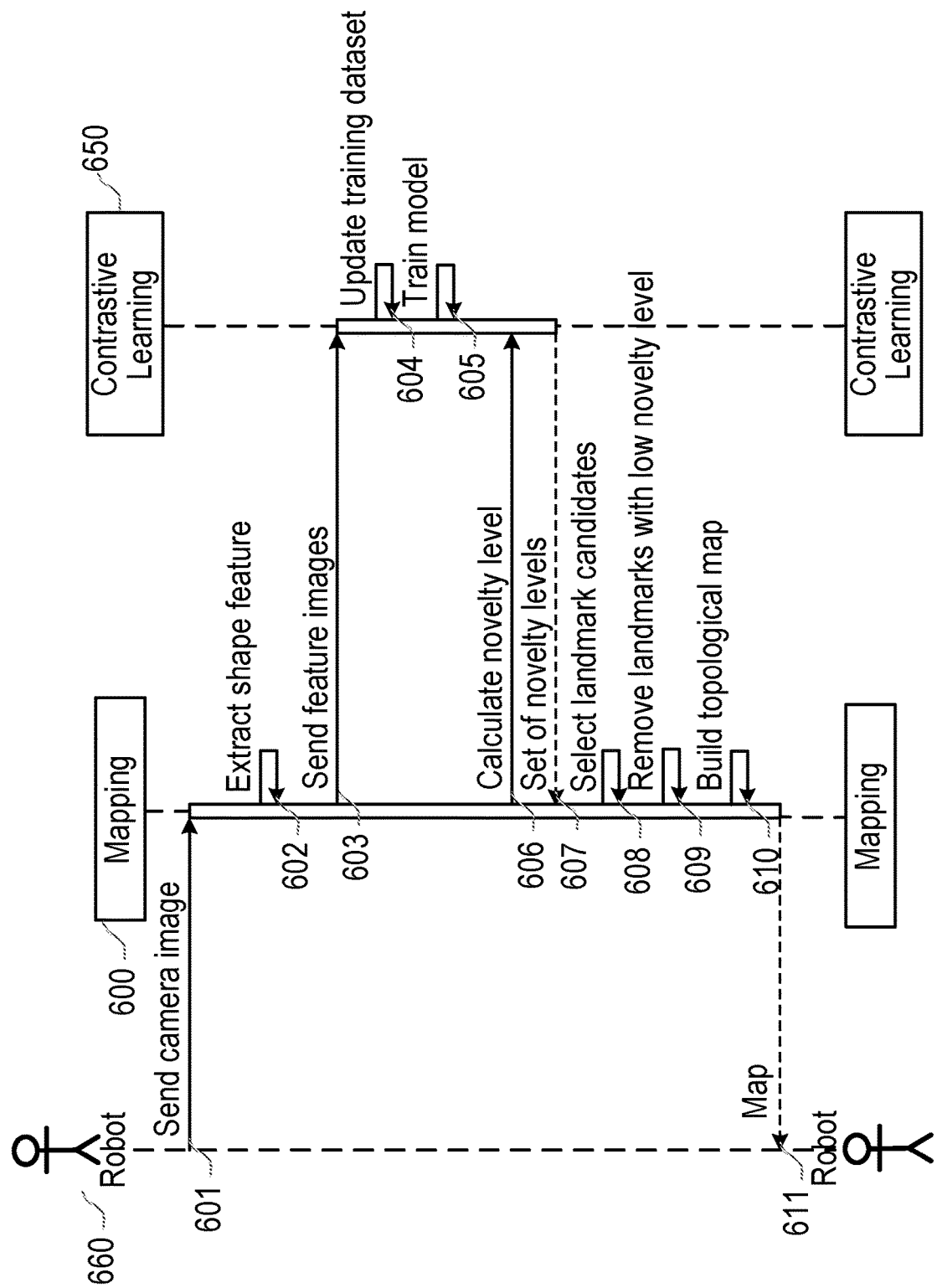
FIG. 6 illustrates how the process of FIG. 4 may be implemented in a mapping node and a contrastive learning node.

As previously mentioned, FIG. 6 illustrates how the process of FIG. 4 may be implemented in a mapping node 600 and a contrastive learning node 650.

In step 601, the mapping node receives the first set of images from a mobile device 660. Step 601 corresponds to step 401.

In step 602 the mapping node derives the first set of feature images. Step 602 corresponds to step 402.

In step 603 the mapping node 600 transmits the first set of feature images to the contrastive learning node 650.

In step 604 the contrastive learning node creates the training data set X. Step 604 corresponds to steps 403 and 404 of FIG. 4.

In step 605 the contrastive learning node trains the contrastive learning model. Step 605 corresponds to step 405 of FIG. 4.

In step 606 the mapping node 600 requests that the contrastive learning node calculates novelty levels for the first set of feature images.

In step 607, the contrastive learning node calculates the novelty levels and transmits the novelty levels to the mapping node 600. Step 607 corresponds to step 406 of FIG. 4.

In step 608 the mapping node 600 selects the set of landmark feature images as described in step 407 of FIG. 4.

In step 609 the mapping node removes landmark feature images with low novelty levels as described in step 408 of FIG. 4.

In step 610 the mapping node builds a topological map as described in step 409 of FIG. 4.

In step 611 the mapping node 600 transmits the topological map to the mobile device.

The mapping process described with reference to FIGS. 4 to 6 may therefore be used to build an initial topological map. It will be appreciated that the mapping process may be performed in an offline manner. The initial topological map may then be ready to be used for mobile device localization, which may be performed "online" during autonomous operation of the mobile device.

Figure 7:
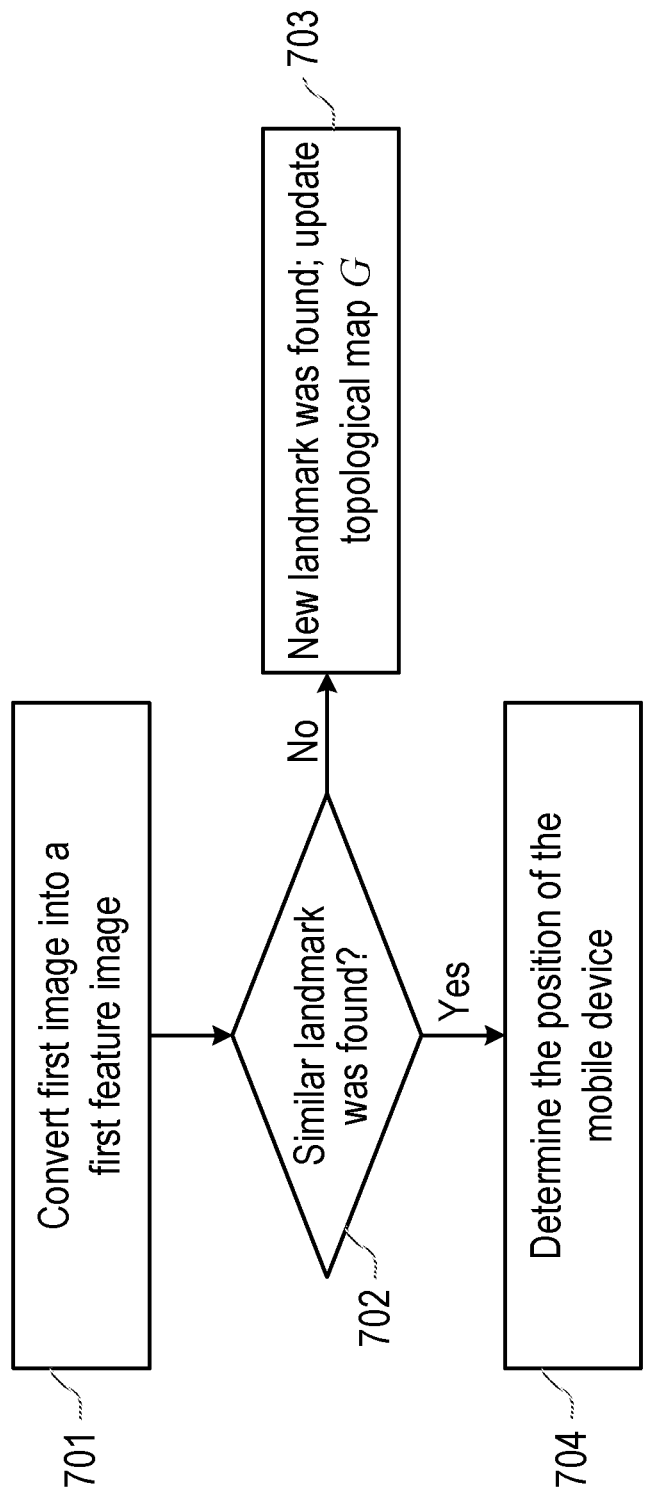
FIG. 7 illustrates an example of a simultaneous localization and map update process.

FIG. 7 illustrates an example of a simultaneous localization and map update process. How the process of FIG. 7 may be implemented by the mapping node, the contrastive learning node and the localization node is described in more detail with reference to FIGS. 15 and 16.

In the simultaneous localization and map update process, the mobile device position may be given by the position associated with the landmark feature image that has the highest similarity with the current observation of the mobile device. However, if a corresponding landmark feature image is not found, there is an indication that a novel landmark has been found by the mobile device, and that the map should be updated.

In step 701, the method comprises converting a first image/obtained from the mobile device into a first feature image B by using the function $f(.)$.

In step 702 the method comprises determining, using the contrastive learning model $g(.)$, whether the first feature image is similar to any of the set of landmark feature images. In particular, step 702 may comprise utilizing a similarity model $h(.)$ which is derived from the contrastive learning model $g(.)$. How the similarly model $h(.)$ may be derived is described in more detail with reference to FIG. 11.

If in step 702 it is determined that the none of the set of landmark features images are similar to the first feature image, the method passes to step 703 in which it is determined that a new potential landmark has been found. In particular, step 703 may comprise regenerating the topological map which may be performed by retraining the contrastive learning model based on an updated set of feature images comprising the first feature image. An example implementation of step 703 is described in more detail with reference to FIG. 8.

The regeneration of the topological map may be performed when all landmark feature images presented low similarity to the first feature image. In other words, first feature image did not have correspondence with any landmark, and therefore, it is considered as novel information.

Figure 8:
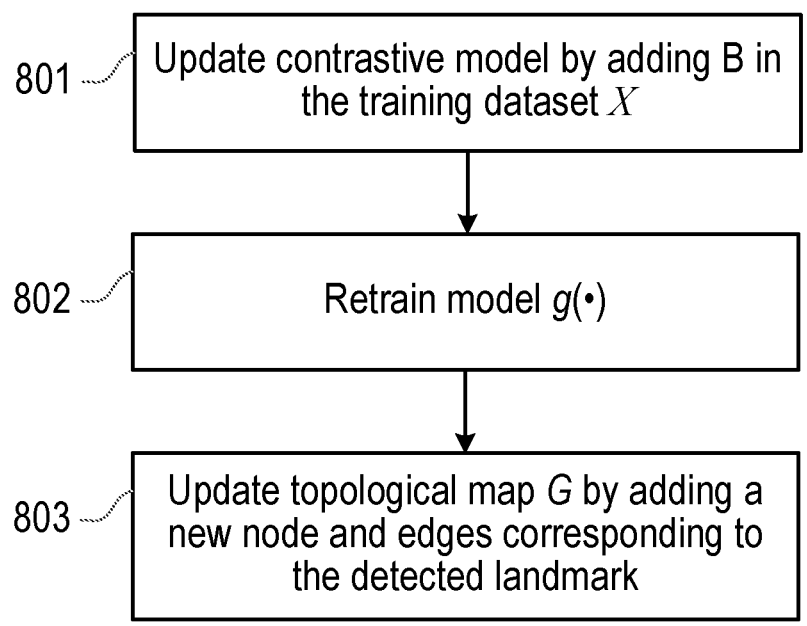
FIG. 8 illustrates an example implementation of step of FIG. 7.

FIG. 8 illustrates an example implementation of step 703 of FIG. 7.

In step 801, the method comprises adding the first feature image B that triggered the map update to the training dataset x. For example, new unique pairs of feature images (x, x') for the first feature image and target values y may be generated. To perform clustering, the position of the first feature image is required. This may be obtained in a similar manner as to during the mapping process, e.g. using odometry or other available positioning information. Similarly to as previously described, data augmentation may be employed on each pair of images.

In step 802, the method comprises retraining the contrastive learning model in the same manner as described with reference to steps 405 and 406 of FIG. 4.

In step 803 the method comprises regenerating the topological map based on the retrained contrastive learning model. Step 803 may be performed in the same manner as described with reference to steps 407 to 408 of FIG. 4. It will be appreciated that in some examples the updated topological map may comprise a new landmark feature image due to the inclusion of the first feature image in the training data set. However, in some examples, due to the selection of only one landmark feature within a cluster when generating the topological map, there may be no new landmark feature images in the updated topological map. However, in some circumstances the optimized positioning of the landmarks may have changed slightly.

Figure 9B:
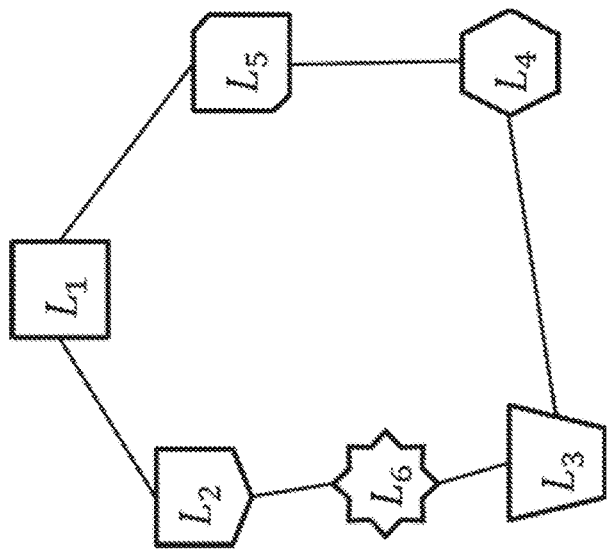
FIGS. 9a and 9b illustrate an example of how a topological map may be updated.
Figure 9A:
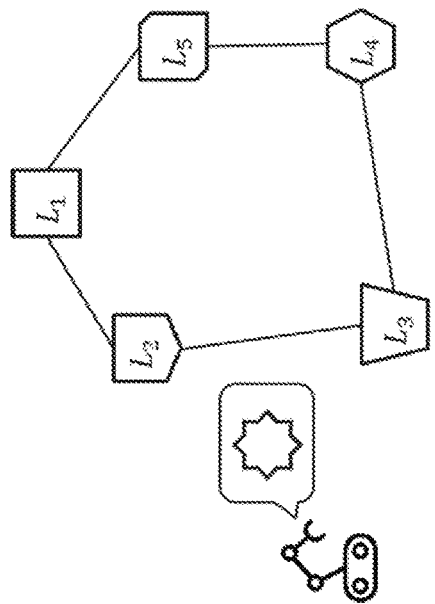

FIGS. 9a and b illustrate an example of how a topological map may be updated.

In FIG. 9a, it can be seen that the image captured by the mobile device produces low similarly values when compared to the landmark feature images $L_1$ to $L_6$. In this example, when the topological map is updated as in FIG. 9b, a new landmark feature image $L_6$ is produced based on the image captured by the mobile device.

Returning to FIG. 7, if in step 702 it is determined that the at least one of the set of landmark features images are similar to the first feature image, the method passes to step 704 in which the similarity values and a previous position of the mobile device may be used to determine a the position of the mobile device.

For example, step 704 may comprise utilizing Markov localization to determine the position of the mobile device. For example, a set $Q=\{q_i\}_{i=1}^m$ may be calculated that corresponds to the probability of the mobile device being on each node $\{v_i\}_{i=1}^m \in V$ in the topological map. The device position at a time instant t, which is denoted here as $d_t$, is given by the node in the topological map associated with the highest probability in Q. This probability set Q may be calculated through a hidden Markov model, which receives as input the previous mobile device location $d_{t-1}$ and the similarity values S.

In other words, step 704 may comprise obtaining a previous location of the mobile device, $d_{t-1}$; and for each landmark feature image, determining, based on: the previous location of the mobile device, positions of the landmark features, and the similarity value associated with the landmark feature image, a probability that the wireless device is located at the landmark associated with the landmark feature image. Step 704 may then further comprise selecting a position of the landmark associated with the landmark feature image associated with the greatest probability as the position of the mobile device.

Figure 10:
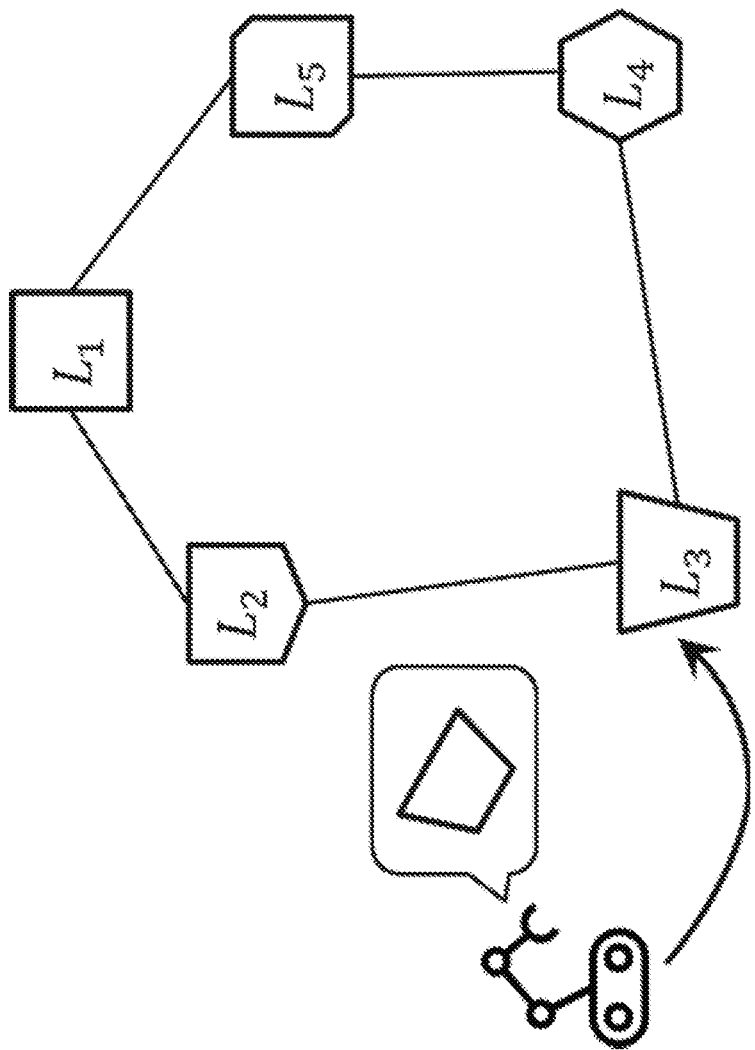
FIG. 10 illustrates an example of how the position of a device may be determined.

FIG. 10 illustrates an example of how the position of a device may be determined. In this example, the image collected from the mobile device is most similar to landmark $L_3$. The Markov localization may then determine (based further on the previous position of the mobile device), that the mobile device is located a landmark $L_3$.

Although the architecture of contrastive learning models may be designed in different ways, the basic structure may be the same. In some examples, the contrastive learning model may comprise a Siamese network. A Siamese network is formed by two identical sub-networks that are combined in the last layer. Basically, each of these sub-networks is formed by a set of convolution and pooling layers that generates a feature array, which may be referred to as shape descriptor.

Figure 11:
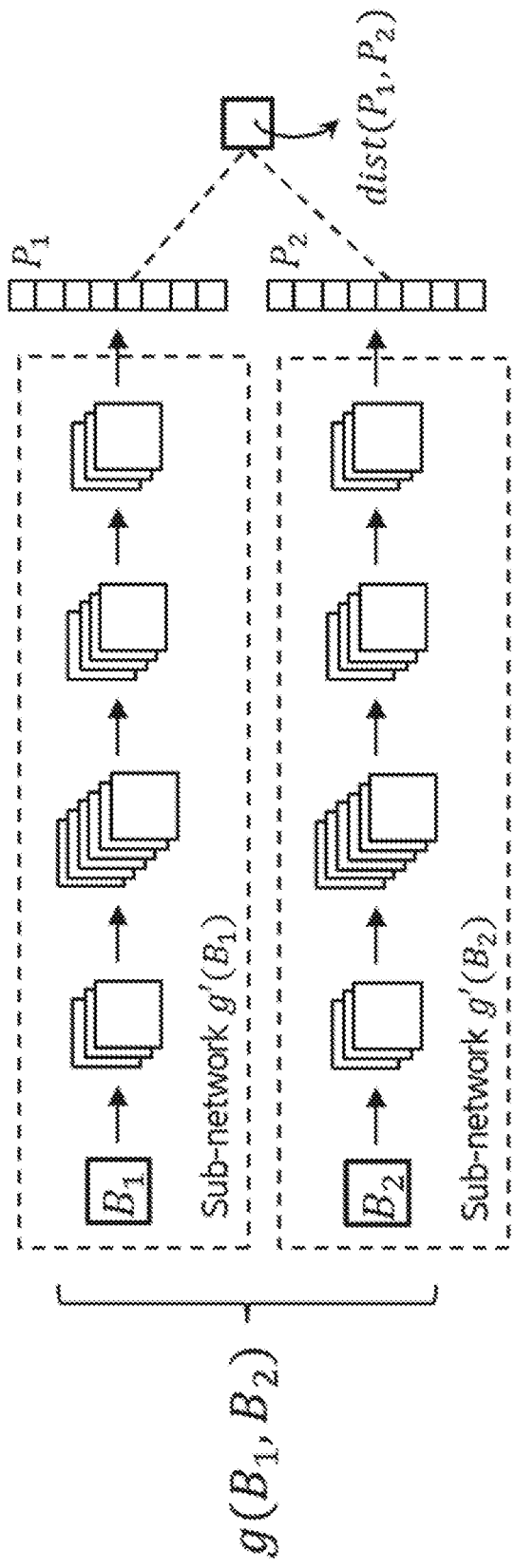
FIG. 11 illustrates an example of a Siamese network for the model $g'(B_1\ B_2)$ comprising sub-networks $g'(B_1)$ and $g'(B_1)$.

FIG. 11 illustrates an example of a Siamese network for the model $g'(B_1\ B_2)$ comprising sub-networks $g'(B_1)$ and $g'(B_1)$. The Siamese network for $g'(B_1\ B_2)$ outputs shape descriptor $P_1$ for the feature $B_1$ and shape descriptor $P_2$ for feature $B_2$.

The similarity between the obtained pair of shape descriptors may then be calculated to generate the output. In some examples, a cosine similarity may be used to determine the similarity between the shape descriptors, but any other distance function can be employed. A Siamese network may be used for the contrastive learning model in generating the topological map as described above.

Figure 12:
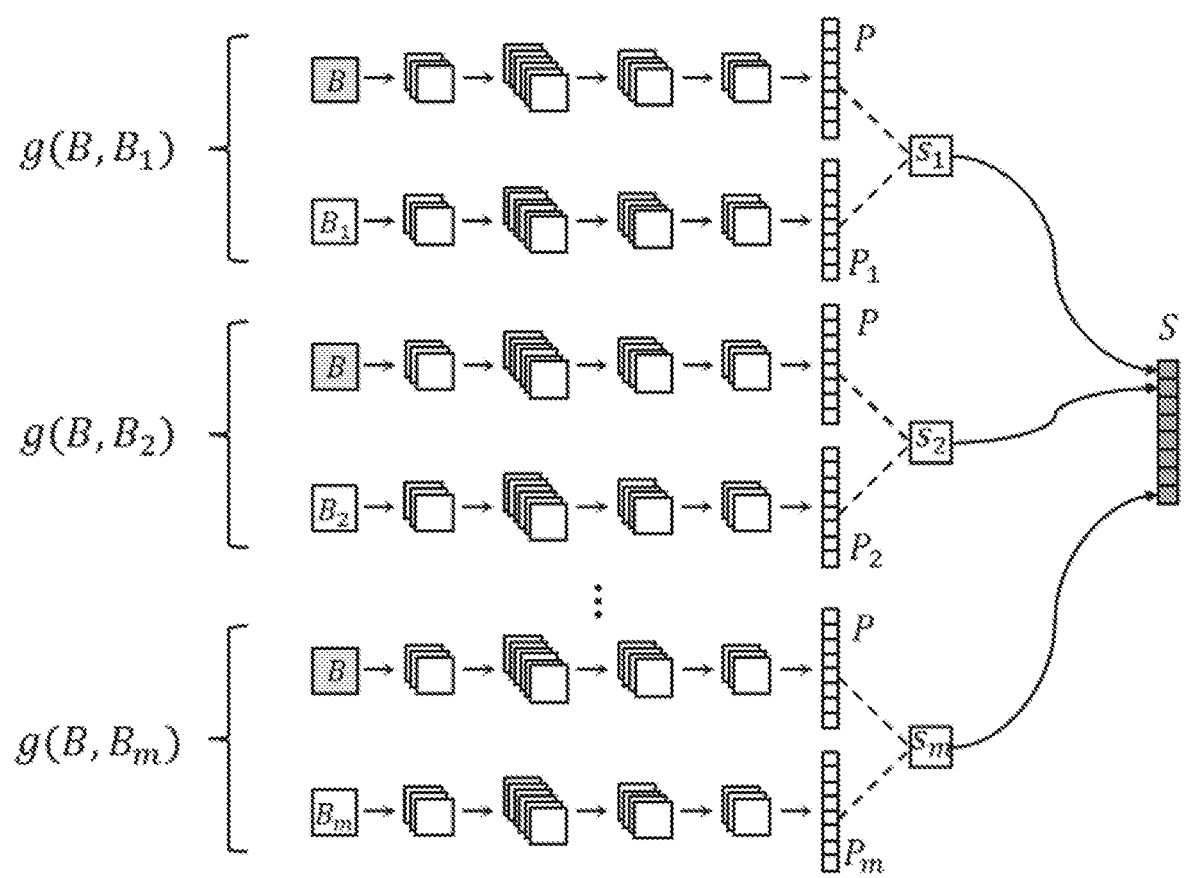
FIG. 12 illustrates an example of a Siamese network.

However, a drawback of this Siamese network is that it is not optimal to perform the comparison of multiple instances at once, which is required in the localization process. This situation is illustrated in FIG. 12, where m inferences of the model are performed. Additional drawbacks of this architecture are enlisted below:

During the localization, it is necessary to determine the similarity of the feature image B to all landmarks on V. By employing the aforementioned architecture, it would require performing m inferences of the model g(.) each time the localization is executed.

As each model is formed by two sub-networks, it also can be stated that 2*m executions of sub-networks will happen to generate the feature array.

In each of m inferences, one of the sub-network will always process the same input B as illustrated in FIG. 12.

This scenario may be affordable when there are only a few landmarks on the topological map. However, the computation cost may grow exponentially as more landmarks are added to the map. To overcome this situation, a similarity model derived from the contrastive learning model is proposed.

Figure 13:
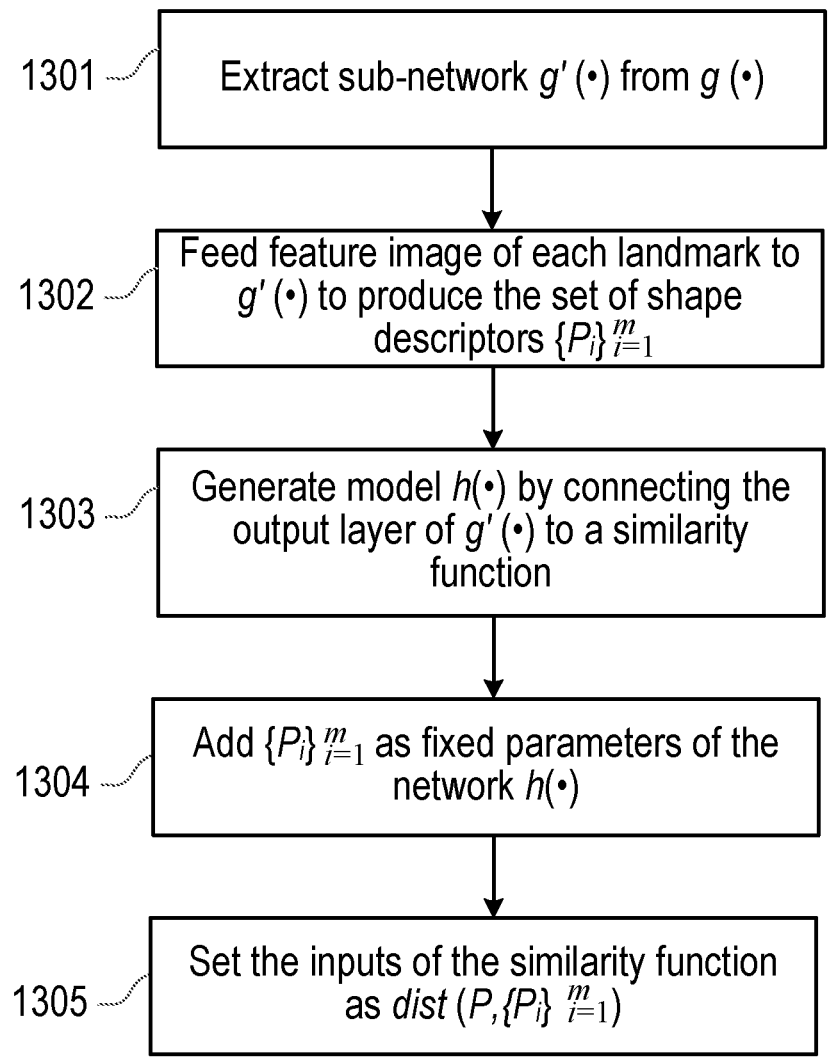
FIG. 13 illustrates an example of how the similarity model $h(.)$ may be derived from a contrastive learning model $g(.)$.

FIG. 13 illustrates an example of how the similarity model h(.) may be derived from a contrastive learning model g(.).

In step 1301, the method comprises extracting a subnetwork, g'(.), from the contrastive learning model, wherein the subnetwork is configured to receive a feature image and output a shape descriptor of the feature image.

In step 1302, the method comprises using the subnetwork to determine landmark shape descriptors for each of the landmark feature images. In other words, for each landmark in the set of nodes $v_m$ in V, feed the corresponding feature image $B_m$ in to the sub-network g'(.) to produce the corresponding shape descriptor. This may result in the set $\{P_i\}_{i=1}^m$.

In step 1303 the method comprises generating the similarity model by connecting the subnetwork to a similarity function such that the similarity function is configured to receive the output of the subnetwork and compare the output of the subnetwork to each of the landmark shape descriptors. In other words, step 1303 may comprise generating the similarity model h(.) by connecting the output layer of g'(.) to the similarity function dist(.) (e.g. cosine similarity). It is highlighted that dist(.) may compute the similarity between a feature array and a set of feature arrays.

In step 1304, the set of shape descriptors (P=: may be set as parameters of the similarity model h(.). It will be appreciated that these values will therefore not have to be calculated when the model is used (as would be the case for the Siamese module illustrated in FIGS. 11 and 12).

In step 1305 the method comprises setting the input of the similarity function as $dist(P, \{P_i\}_{i=1}^m)$. Consequently, each inference will produce a set of similarity values.

The resulting similarity model h(.) comprises a single sub-network that produces a feature array. The architecture also has the pre-calculated feature arrays of all landmark features stored as parameters of the similarity model. In the last layer of the similarity model, the similarity between the produced feature array and each landmarks' feature array is calculated.

Figure 14:
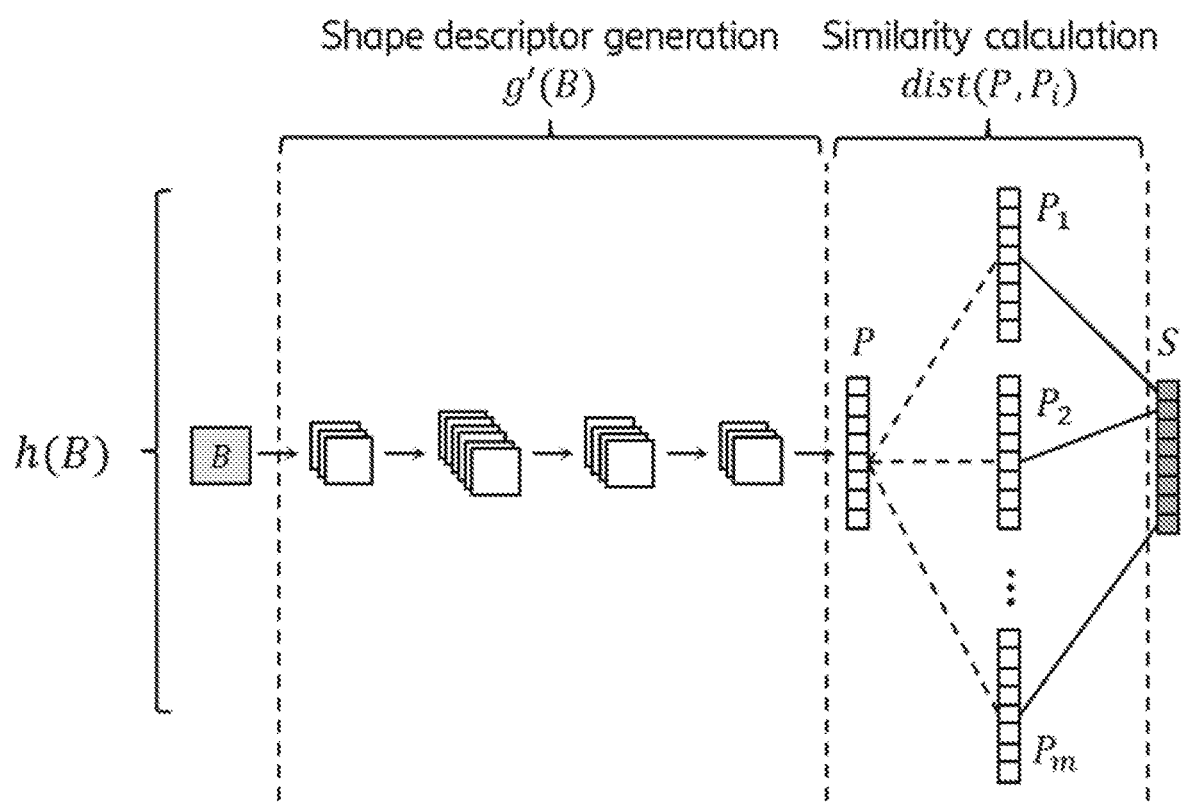
FIG. 14 illustrates an example architecture of the similarity model $h(.)$.

FIG. 14 illustrates an example architecture of the similarity model h(.). This similarity model only requires a single inference, and a single process of the sub-network, regardless of the number of landmark features.

In general, the feature image B is used as input of h(:). This image is processed in the first part of the similarity model h(.), which produces the shape descriptor P. Essentially, the shape descriptor P is a fixed size array of real numbers with dimension d.

The second part of the model h(.) calculates the similarity between descriptor P and the shape descriptor of each landmark in v. It is highlighted that the descriptor of the landmarks is already pre-calculated and do not have to be calculated during the inference. The similarity may be calculated using a cosine similarity function (or by another distance function), which returns the array $S=\{s_i\}_{i=1}^m$.

Referring back to FIG. 7, in step 702 when the similarity model is used to determine whether a the first feature image is similar to any of the landmark feature images, in examples in which $\Sigma_{i=1}^m s \approx 0$, this means that a similar landmark feature image was not found. This triggers the update of the topological map in step 703. Otherwise, the method proceeds to the determine the position of the mobile device, for example using Markov localization.

Figure 15:
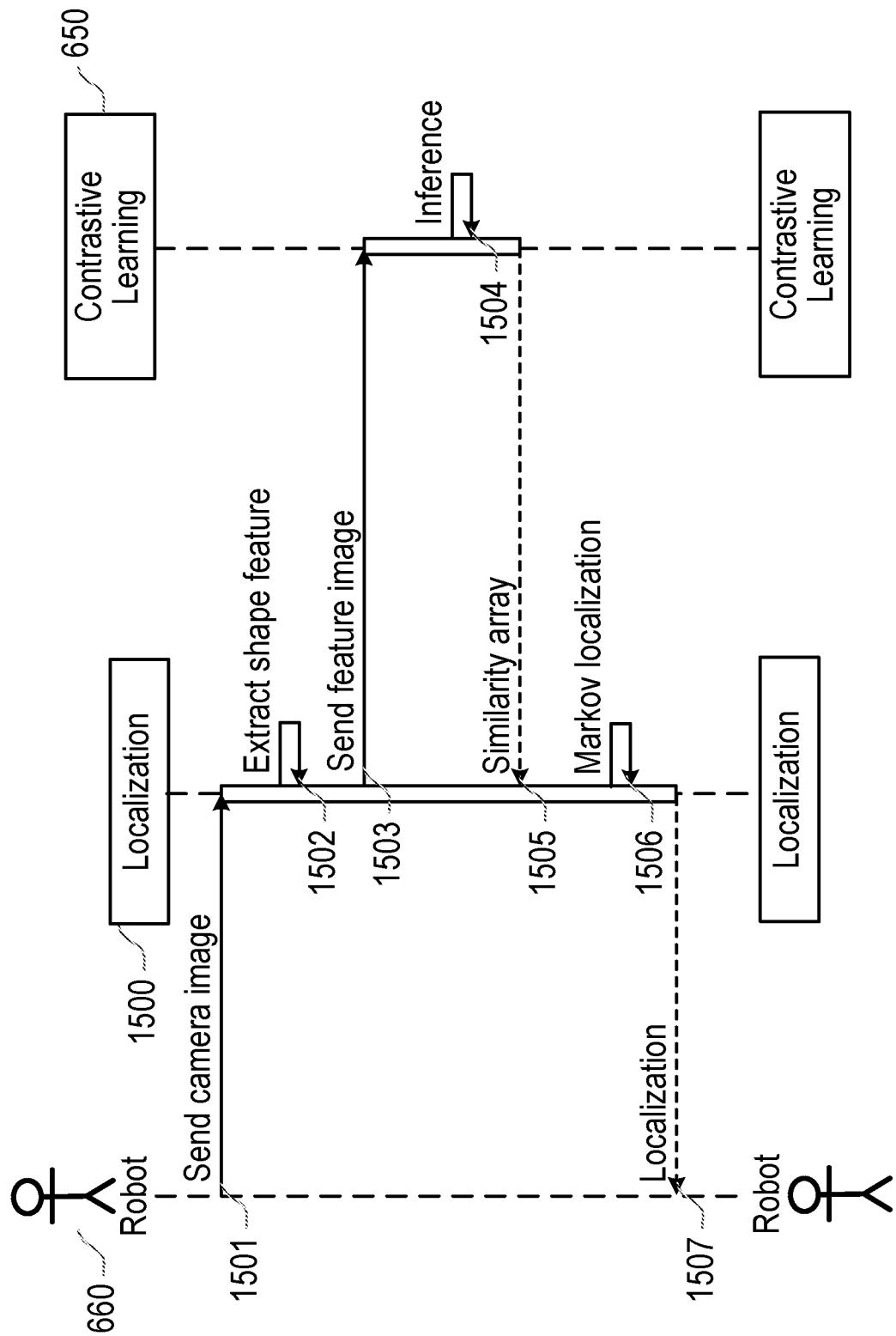
FIG. 15 illustrates an example implementation of FIG. 7 in which the position of a mobile device is determined.

FIG. 15 illustrates an example implementation of FIG. 7 in which the position of a mobile device 660 is determined. In this example, the method is implemented by a localization node 1500 and a contrastive learning node 650. It will be appreciated that the contrastive learning node 650 may be the same as the contrastive learning node 650 illustrated in FIG. 6. The contrastive learning node 650 may be configured to perform the method as described with reference to FIG. 1. The localization node 1500 may be configured to perform the method as described with reference to FIG. 3.

In step 1501 the localization node 1500 receives a first image from the mobile device 660.

In step 1502, the localization node 1500 derives a first feature image from the first image. For example, as described with reference to step 701 of FIG. 7.

In step 1503, the localization node 1500 transmits the first feature image to the contrastive learning node 650.

In step 1504 the contrastive learning node determines the similarity values indicating the similarity of the first feature image to the set of landmark feature images. Step 604 may correspond to step 702 of FIG. 7.

In step 1505 the contrastive learning node initiates determination of the position of the mobile device by transmitting the similarity values to the localization node.

In step 1506, the localization node 1500, responsive to the first feature image being similar to at least one landmark feature image, determines the position of the mobile device based on the similarity values. Step 1506 may correspond to step 704 of FIG. 7.

In step 1507, the localization node 1507 may transmit an indication of the position of the mobile device to the mobile device 660.

Figure 16:
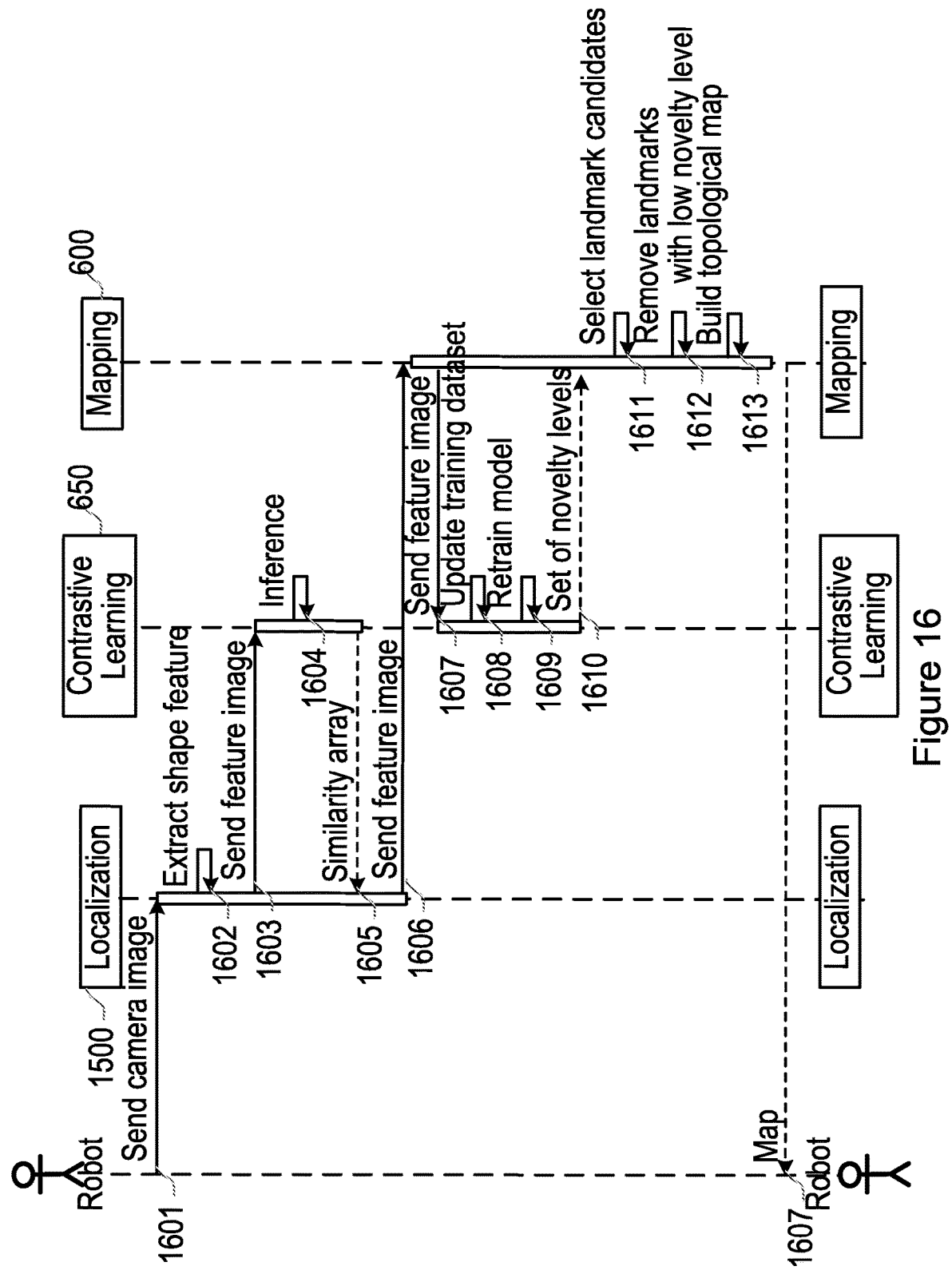
FIG. 16 illustrates an example implementation of FIG. 7 in which the topological map is updated.

FIG. 16 illustrates an example implementation of FIG. 7 in which the topological map is updated. In this example, the method is implemented by a localization node 1500, a contrastive learning node 650 and a mapping node 600. It will be appreciated that the contrastive learning node 650 may be the same as the contrastive learning node 650 illustrated in FIG. 6. The contrastive learning node 650 may be configured to perform the method as described with reference to FIG. 1. The localization node 1500 may be configured to perform the method as described with reference to FIG. 3. The mapping node 600 may be configured to perform the method as described with reference to FIG. 2.

In step 1601, the localization node 1500 receives a first image from the mobile device 660.

In step 1602, the localization node 1500 derives a first feature image from the first image. For example, as described with reference to step 701 of FIG. 7.

In step 1603, the localization node 1500 transmits the first feature image to the contrastive learning node 650.

In step 1604, the contrastive learning node 650 determines the similarity values indicating the similarity of the first feature image to the set of landmark feature images. Step 604 may correspond to step 702 of FIG. 7.

In step 1605, the contrastive learning node 650 transmits the similarity values to the localization node.

In this example, the similarity values indicate that the first feature image is not similar to any of the landmark feature images. In this example therefore, the localization node 1500 initiates retraining of the contrastive learning model by transmitting the first feature image to the mapping node in step 1606.

In step 1607, the mapping node 600 initiates retraining of the contrastive learning model by transmitting the first feature image to the contrastive learning node 650.

In step 1608, the contrastive learning node 650 updates the training data set X by including the first feature image in the first set of feature images that are used to generate the training data set X. Step 1608 corresponds to step 801 in FIG. 8.

In step 1609, the contrastive learning node 650 retrains the contrastive learning model. Step 1609 may correspond to step 802 of FIG. 8.

In step 1610, the contrastive learning node 650 transmits the novelty levels to the mapping node 600.

In step 1611, the mapping node 600 selects a set of landmark feature images based on the received novelty levels. Step 1611 may correspond to step 803 of FIG. 8 and step 407 of FIG. 4.

In step 1612, the mapping node 600 removes landmark feature images with low novelty levels. Step 1612 may correspond to step 803 of FIG. 8 and step 408 of FIG. 4.

In step 1613, the mapping node 600 builds a updated topological map. Step 1613 may correspond to step 803 of FIG. 8 and step 409 of FIG. 4.

It will be appreciated, as previously described, that although the methods of FIGS. 15 and 16 illustrate particular steps of the methods described herein as being performed by particular nodes, the three nodes may be implemented in many different ways, For example, the localization node 1500 may be implemented in the mobile device, or at a low-latency edge node (for example if real-time localization is important). The mapping node 600 may be implemented in the mobile device 660, for example if the computational resources of the mobile device 660 allow it, but the mapping node 600 may also be placed in an edge/cloud node as long as current environment is reasonably known. The contrastive learning node 650 may be placed inside the mobile device if enough computational resources are available, but may also be placed at an edge or remote cloud node with enough computational resources for training the models, which is usually quite computationally expensive.

In some example, for the simultaneous localization and update of the topological map, real-time constraints may require the localization node 1500 and the contrastive learning node 650 to be implemented in the same node.

Figure 17:
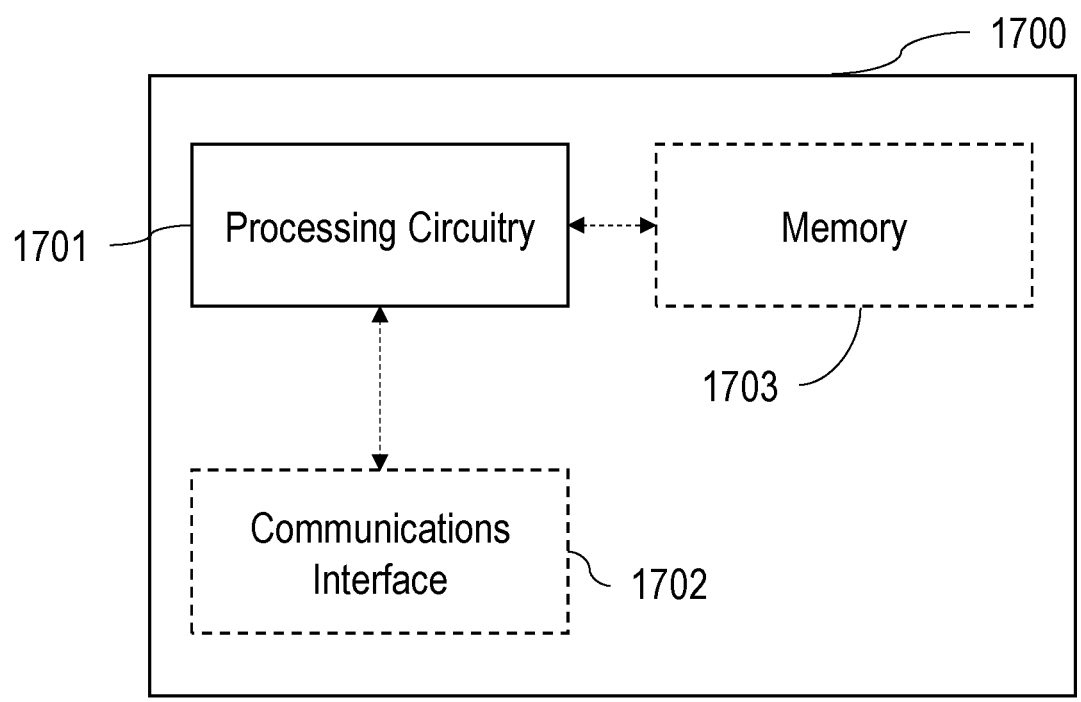
FIG. 17 illustrates a contrastive learning node comprising processing circuitry (or logic)

FIG. 17 illustrates a contrastive learning node 1700 comprising processing circuitry (or logic) 1701. The processing circuitry 1701 controls the operation of the contrastive learning node 1700 and can implement the method described herein in relation to a contrastive learning node 1700. The processing circuitry 1701 can comprise one or more processors, processing units, multi-core processors or modules that are configured or programmed to control the contrastive learning node 1700 in the manner described herein. In particular implementations, the processing circuitry 1701 can comprise a plurality of software and/or hardware modules that are each configured to perform, or are for performing, individual or multiple steps of the method described herein in relation to the contrastive learning node 1700.

Briefly, the processing circuitry 1701 of the contrastive learning node 1700 is configured to: obtain a set of landmark feature images representing a set of landmark features in the environment, wherein the set of landmark features images are for use in determining positions of wireless devices in the environment; obtain a first feature image derived from a first image captured by the mobile device; determine, using a contrastive learning model, whether the first feature image is similar to any of the set of landmark feature images, wherein the contrastive learning model is trained based on a first set of feature images; responsive to determining that a landmark feature image is similar to the first feature image, initiate determination of a position of the mobile device; and responsive to determining that none of the set of landmark features images are similar to the first feature image, retrain the contrastive learning model based on an updated set of feature images comprising the first feature image.

In some embodiments, the contrastive learning node 1700 may optionally comprise a communications interface 1702. The communications interface 1702 of the contrastive learning node 1700 can be for use in communicating with other nodes, such as other virtual nodes. For example, the communications interface 1702 of the contrastive learning node 1700 can be configured to transmit to and/or receive from other nodes requests, resources, information, data, signals, or similar. The processing circuitry 1701 of contrastive learning node 1700 may be configured to control the communications interface 1702 of the contrastive learning node 1700 to transmit to and/or receive from other nodes requests, resources, information, data, signals, or similar.

Optionally, the contrastive learning node 1700 may comprise a memory 1703. In some embodiments, the memory 1703 of the contrastive learning node 1700 can be configured to store program code that can be executed by the processing circuitry 1701 of the contrastive learning node 1700 to perform the method described herein in relation to the contrastive learning node 1700. Alternatively or in addition, the memory 1703 of the contrastive learning node 1700, can be configured to store any requests, resources, information, data, signals, or similar that are described herein. The processing circuitry 1701 of the contrastive learning node 1700 may be configured to control the memory 1703 of the contrastive learning node 1700 to store any requests, resources, information, data, signals, or similar that are described herein.

Figure 18:
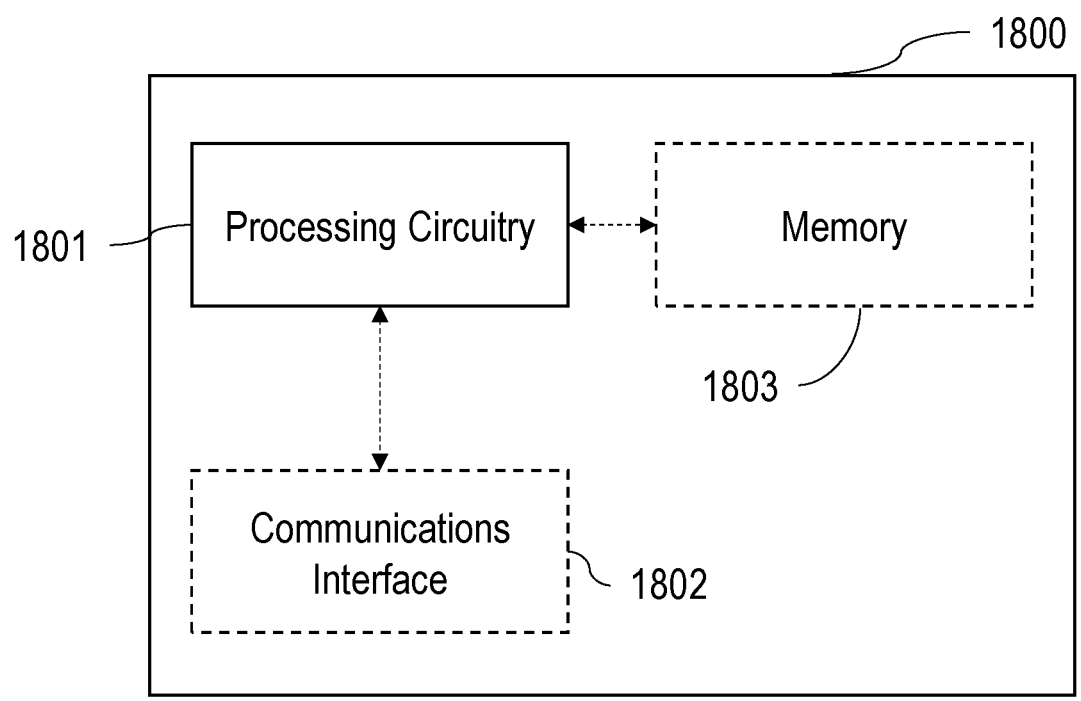
FIG. 18 illustrates a mapping node comprising processing circuitry (or logic)

FIG. 18 illustrates a mapping node 1800 comprising processing circuitry (or logic) 1801. The processing circuitry 1801 controls the operation of the mapping node 1800 and can implement the method described herein in relation to a mapping node 1800. The processing circuitry 1801 can comprise one or more processors, processing units, multi-core processors or modules that are configured or programmed to control the mapping node 1800 in the manner described herein. In particular implementations, the processing circuitry 1801 can comprise a plurality of software and/or hardware modules that are each configured to perform, or are for performing, individual or multiple steps of the method described herein in relation to the mapping node 1800.

Briefly, the processing circuitry 1801 of the mapping node 1800 is configured to: obtain a set of landmark feature images for use in determining positions of wireless devices in the environment, wherein the set of landmark feature images are obtained using a contrastive learning model trained based on a first set of feature images; and responsive to obtaining an indication that none of the set of landmark features images are similar to a first feature image derived from a first image captured by the mobile device, initiate retraining of the contrastive learning model based on an updated set of feature images comprising the first feature image.

In some embodiments, the mapping node 1800 may optionally comprise a communications interface 1802. The communications interface 1802 of the mapping node 1800 can be for use in communicating with other nodes, such as other virtual nodes. For example, the communications interface 1802 of the mapping node 1800 can be configured to transmit to and/or receive from other nodes requests, resources, information, data, signals, or similar. The processing circuitry 1801 of mapping node 1800 may be configured to control the communications interface 1802 of the mapping node 1800 to transmit to and/or receive from other nodes requests, resources, information, data, signals, or similar.

Optionally, the mapping node 1800 may comprise a memory 1803. In some embodiments, the memory 1803 of the mapping node 1800 can be configured to store program code that can be executed by the processing circuitry 1801 of the mapping node 1800 to perform the method described herein in relation to the mapping node 1800. Alternatively or in addition, the memory 1803 of the mapping node 1800, can be configured to store any requests, resources, information, data, signals, or similar that are described herein. The processing circuitry 1801 of the mapping node 1800 may be configured to control the memory 1803 of the mapping node 1800 to store any requests, resources, information, data, signals, or similar that are described herein.

Figure 19:
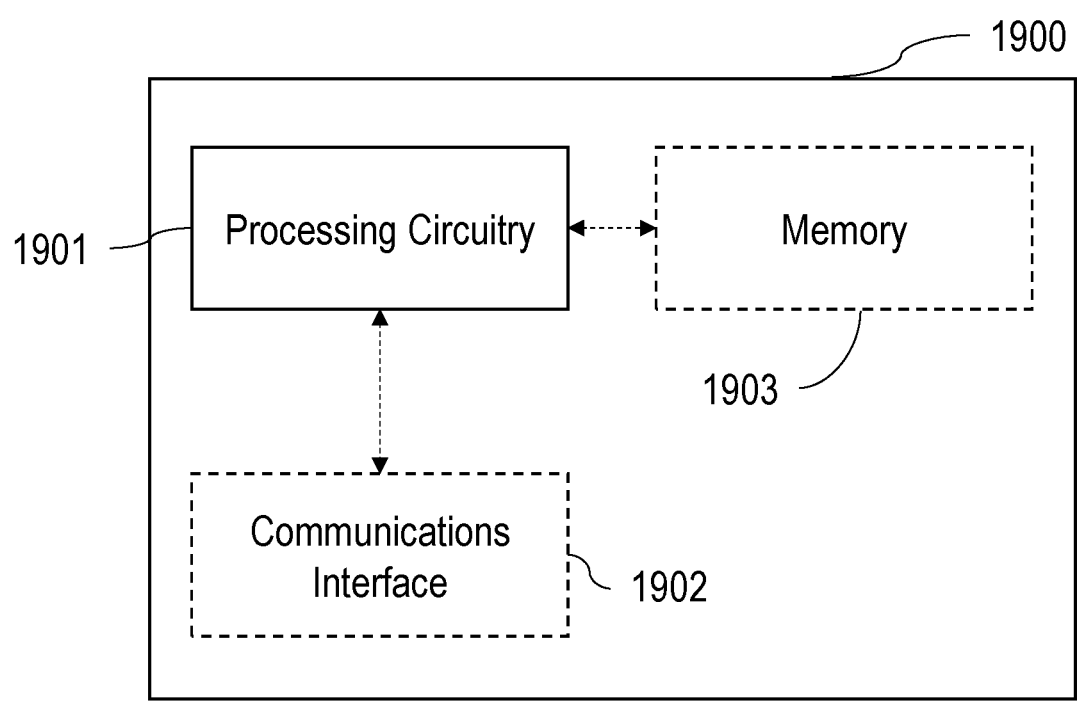
FIG. 19 illustrates a localization node comprising processing circuitry (or logic)

FIG. 19 illustrates a localization node 1900 comprising processing circuitry (or logic) 1901. The processing circuitry 1901 controls the operation of the localization node 1900 and can implement the method described herein in relation to a localization node 1900. The processing circuitry 1901 can comprise one or more processors, processing units, multi-core processors or modules that are configured or programmed to control the localization node 1900 in the manner described herein. In particular implementations, the processing circuitry 1901 can comprise a plurality of software and/or hardware modules that are each configured to perform, or are for performing, individual or multiple steps of the method described herein in relation to the localization node 1900.

Briefly, the processing circuitry 1901 of the localization node 1900 is configured to: obtain a first feature image derived from a first image captured by the mobile device; obtain an indication of whether the first feature image is similar to any of a set of landmark feature images, wherein the landmark feature images are for use in determining positions of wireless devices in the environment and wherein the landmark feature images represent a set of landmark features in the environment, and wherein the indication is determined using a contrastive learning model trained based on a first set of feature images; responsive to the indication indicating that a landmark feature image is similar to the first feature image, determine the position of the mobile device; and responsive to the indication indicating that none of the set of landmark features images are similar to the first feature image, initiate retraining of the contrastive learning model based on an updated set of feature images comprising the first feature image.

In some embodiments, the localization node 1900 may optionally comprise a communications interface 1902. The communications interface 1902 of the localization node 1900 can be for use in communicating with other nodes, such as other virtual nodes. For example, the communications interface 1902 of the localization node 1900 can be configured to transmit to and/or receive from other nodes requests, resources, information, data, signals, or similar. The processing circuitry 1901 of localization node 1900 may be configured to control the communications interface 1902 of the localization node 1900 to transmit to and/or receive from other nodes requests, resources, information, data, signals, or similar.

Optionally, the localization node 1900 may comprise a memory 1903. In some embodiments, the memory 1903 of the localization node 1900 can be configured to store program code that can be executed by the processing circuitry 1901 of the localization node 1900 to perform the method described herein in relation to the localization node 1900. Alternatively or in addition, the memory 1903 of the localization node 1900, can be configured to store any requests, resources, information, data, signals, or similar that are described herein. The processing circuitry 1901 of the localization node 1900 may be configured to control the memory 1903 of the localization node 1900 to store any requests, resources, information, data, signals, or similar that are described herein.

Figure 20:
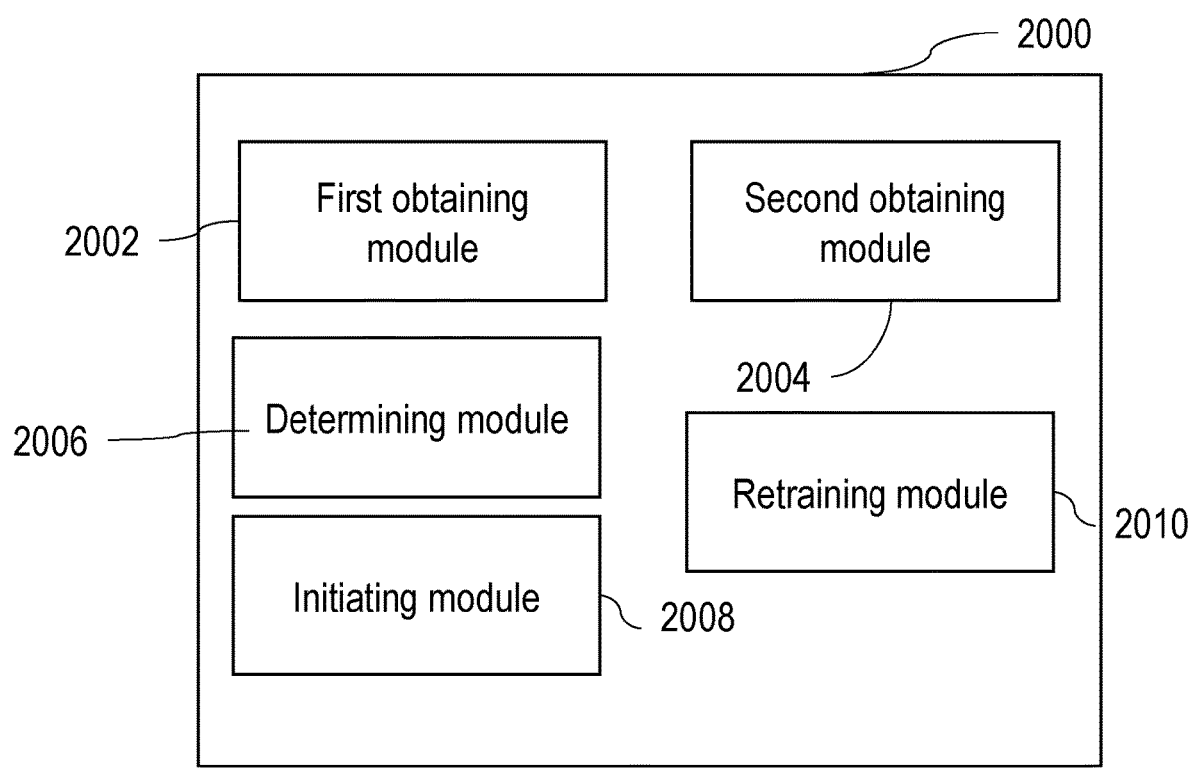
FIG. 20 is a block diagram illustrating a contrastive learning node in accordance with an embodiment.

FIG. 20 is a block diagram illustrating a contrastive learning node 2000 in accordance with an embodiment. The contrastive learning node 2000 may enable determination of a position of a mobile device in an environment. The contrastive learning node 2000 comprises a first obtaining module 2002 configured to obtain a set of landmark feature images representing a set of landmark features in the environment, wherein the set of landmark features images are for use in determining positions of wireless devices in the environment. The contrastive learning node 2000 comprises a second obtaining module 2004 configured to obtain a first feature image derived from a first image captured by the mobile device. The contrastive learning node 2000 comprises a determining module 2006 configured to determine, using a contrastive learning model, whether the first feature image is similar to any of the set of landmark feature images, wherein the contrastive learning model is trained based on a first set of feature images. The contrastive learning node 2000 comprises an initiating module 2008 configured to responsive to determining that a landmark feature image is similar to the first feature image, initiate determination of a position of the mobile device. The contrastive learning node 2000 comprises a retraining module 2010 configured to responsive to determining that none of the set of landmark features images are similar to the first feature image, retrain the contrastive learning model based on an updated set of feature images comprising the first feature image. The contrastive learning node 2000 may operate in the manner described herein in respect of a contrastive learning node.

Figure 21:
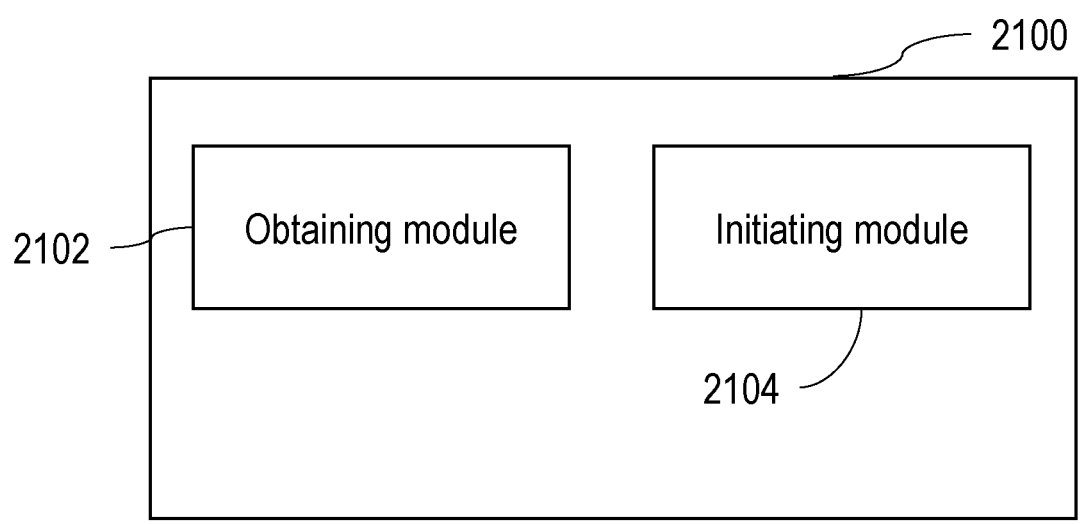
FIG. 21 is a block diagram illustrating a mapping node in accordance with an embodiment.

FIG. 21 is a block diagram illustrating a mapping node 2100 in accordance with an embodiment. The mapping node 2100 may enable determination of a position of a mobile device in an environment. The mapping node 2100 comprises an obtaining module 2102 configured to obtain a set of landmark feature images for use in determining positions of wireless devices in the environment, wherein the set of landmark feature images are obtained using a contrastive learning model trained based on a first set of feature images. The mapping node 2100 comprises an initiating module 2104 configured to, responsive to obtaining an indication that none of the set of landmark features images are similar to a first feature image derived from a first image captured by the mobile device, initiate retraining of the contrastive learning model based on an updated set of feature images comprising the first feature image. The mapping node 2100 may operate in the manner described herein in respect of a mapping node.

Figure 22:
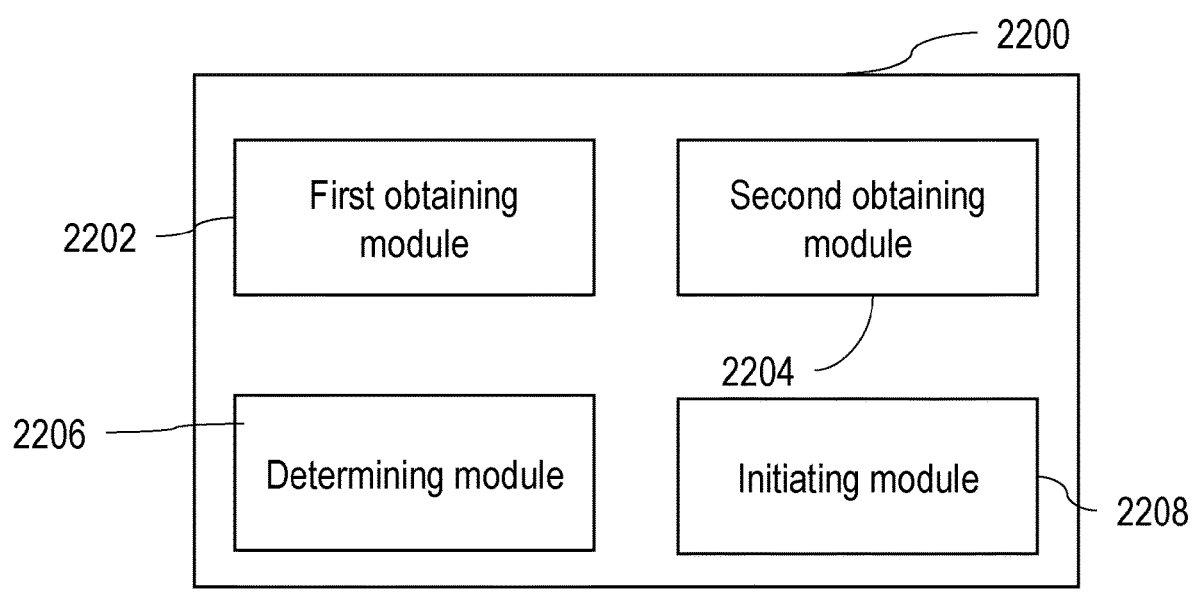
FIG. 22 is a block diagram illustrating a localization node in accordance with an embodiment.

FIG. 22 is a block diagram illustrating a localization node 2200 in accordance with an embodiment. The localization node 2200 may enable determination of a position of a mobile device in an environment. The localization node 2200 comprises a first obtaining module 2202 configured to obtain a first feature image derived from a first image captured by the mobile device. The localization node 2200 comprises a second obtaining module 2204 configured to obtain an indication of whether the first feature image is similar to any of a set of landmark feature images, wherein the landmark feature images are for use in determining positions of wireless devices in the environment and wherein the landmark feature images represent a set of landmark features in the environment, and wherein the indication is determined using a contrastive learning model trained based on a first set of feature images. The localization node 2200 comprises a determining module 2206 configured to, responsive to the indication indicating that a landmark feature image is similar to the first feature image, determine the position of the mobile device. The localization node 2200 comprises an initiating module 2208 configured to, responsive to the indication indicating that none of the set of landmark features images are similar to the first feature image, initiate retraining of the contrastive learning model based on an updated set of feature images comprising the first feature image. The localization node 2200 may operate in the manner described herein in respect of a localization node.

There is also provided a computer program comprising instructions which, when executed by processing circuitry (such as the processing circuitry 1701 of the contrastive learning node 1700, the processing circuitry 1801 of the mapping node 1800 or the processing circuitry 1901 of the localisation node 1900 described earlier), cause the processing circuitry to perform at least part of the method described herein. There is provided a computer program product, embodied on a non-transitory machine-readable medium, comprising instructions which are executable by processing circuitry to cause the processing circuitry to perform at least part of the method described herein. There is provided a computer program product comprising a carrier containing instructions for causing processing circuitry to perform at least part of the method described herein. In some embodiments, the carrier can be any one of an electronic signal, an optical signal, an electromagnetic signal, an electrical signal, a radio signal, a microwave signal, or a computer-readable storage medium.

Embodiments described herein allow for automatic detection of new landmarks in an environment. For example, during the update of the topological map, contrastive learning is used to automatically detect the landmarks, based on the lack of similarity of an obtained feature image to existing landmark feature images.

Embodiments described herein allow for topological localization which is supported by contrastive learning.

Embodiments described herein are also capable of being trained based on relatively few samples. In other words, as the architecture of the contrastive learning model is relatively simple, only a few samples may be required to train the model. Contrastive learning is commonly employed in few-shot learning or one-shot learning tasks.

Embodiments described herein also provide a fast inference model. Mobile devices may rely on low processing cost algorithms due to their limited hardware and battery. Although contrastive learning is known for its low inference times, the complexity of the model may grow exponentially when multiclass classification is performed (e.g. in a Siamese network as described above). However, the structure of the similarity model h(.) enables multiclass classification and keeps the complexity of the inference constant, independently of the number of classes.

Embodiments described herein are also sensor agnostic. In other words, most mapping and localization solutions rely on the use of a specific exteroceptive sensor (e.g., a camera or lidar). However, the proposed solution works independently of the adopted sensor thanks to the employment of feature images, which can be extracted either from camera or lidar sensors.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A computer-implemented method for enabling determination of a position of a mobile device in an environment, the method comprising:
    obtaining a set of landmark feature images representing a set of landmark features in the environment, the set of landmark features images being for use in determining positions of wireless devices in the environment;
    obtaining a first feature image derived from a first image captured by the mobile device;
    determining, using a contrastive learning model, whether the first feature image is similar to any of the set of landmark feature images, the contrastive learning model being trained based on a first set of feature images and the contrastive learning model comprising a Siamese network model, the determining, using a contrastive learning model, whether the first feature image is similar to any of the set of landmark feature images comprising:
  determining a similarity model h(.) based on the contrastive learning model g(.); and
  inputting the first feature image into the similarity model to determine whether the first feature image is similar to any of the set of landmark feature images;
responsive to determining that a landmark feature image is similar to the first feature image, initiating determination of a position of the mobile device, the initiating determination of a position of the mobile device comprising transmitting, to a localization node, similarity values indicating the similarity of the first feature image to each of the set of landmark feature images;
responsive to determining that none of the set of landmark features images are similar to the first feature image, retraining the contrastive learning model based on an updated set of feature images comprising the first feature image;
receiving a first set of feature images;
training the contrastive learning model based on the first set of feature images such that the contrastive learning model, q(a,b), outputs a similarity value indicating a similarity between a pair of feature images, a and b; and
for each feature image in the first set of feature images, calculating a novelty level for the feature image based on the similarity values, the novelty level for the feature indicating the dissimilarity of the feature image to all other feature images in the first set of feature images.

2. The method as claimed in claim 1, further comprising:
obtaining positions of the first set of feature images; and clustering the feature images in the first set of feature images according to the positions.

3. The method as claimed in claim 2, further comprising:
generating a training data set for the contrastive learning model, wherein each data entry in the training data set comprises: a unique pair of feature images from the first set of feature images and an indication of whether the pair of feature images are in the same cluster or not.

4. The method as claimed in claim 3, wherein the step of training comprises training the contrastive learning model such that the contrastive learning model is more likely to output that a pair of feature images are similar if the pair of feature images are indicated as being in the same cluster.

5. The method as claimed in claim 1, further comprising transmitting the novelty levels for the first set of feature images to a mapping node.

6. The method as claimed in claim 5, further comprising receiving the first set of feature images from the mapping node.

7. The method as claimed in claim 1, wherein the step of determining a similarity model comprises:
  extracting a subnetwork, g'(.), from the contrastive learning model, wherein the subnetwork in configured to receive a feature image and output a shape descriptor of the feature image;
  using the subnetwork to determine landmark shape descriptors for each of the landmark feature images, and
  generating the similarity model by connecting the subnetwork to a similarity function such that the similarity function is configured to receive the output of the subnetwork and compare the output of the subnetwork to each of the landmark shape descriptors.

8. A computer-implemented method for enabling determination of a position of a mobile device in an environment, the method comprising:
  obtaining a set of landmark feature images for use in determining positions of wireless devices in the environment, the set of landmark feature images being obtained using a contrastive learning model trained based on a first set of feature images and the obtaining the set of landmark feature images further comprising:
    receiving a first set of training images from one or more mobile devices;
    deriving a first set of feature images from the first set of training images: and
    obtaining novelty levels for each of the first set of feature images, the novelty levels indicative of the similarity of each feature image in the first set of feature images to the other feature images in the first set of feature images, the novelty levels received from a contrastive learning node; and
  responsive to obtaining an indication that none of the set of landmark features images are similar to a first feature image derived from a first image captured by the mobile device, initiating retraining of the contrastive learning model based on an updated set of feature images comprising the first feature image.

9. The method as claimed in claim 8, wherein the step of obtaining the indication comprises:
receiving the first feature image from a localization node.

10. The method as claimed in claim 8, wherein the step of initiating retraining of the contrastive learning model comprises:
transmitting the first feature image to a contrastive learning node.

11. A contrastive learning node for enabling determination of a position of a mobile device in an environment, the contrastive learning node comprising:
  processing circuitry configured to cause the contrastive learning node:
    obtain a set of landmark feature images representing a set of landmark features in the environment, the set of landmark features images being for use in determining positions of wireless devices in the environment;
    obtain a first feature image derived from a first image captured by the mobile device;
    determine, using a contrastive learning model, whether the first feature image is similar to any of the set of landmark feature images, the contrastive learning model being trained based on a first set of feature images and the contrastive learning model comprising a Siamese network model, the determining, using a contrastive learning model, whether the first feature image is similar to any of the set of landmark feature images comprising:
      determining a similarity model h(.) based on the contrastive learning model g(.); and
      inputting the first feature image into the similarity model to determine whether the first feature image is similar to any of the set of landmark feature images;
    responsive to determining that a landmark feature image is similar to the first feature image, initiate determination of a position of the mobile device, the initiating determination of a position of the mobile device comprising transmitting, to a localization node, similarity values indicating the similarity of the first feature image to each of the set of landmark feature images; and responsive to determining that none of the set of landmark features images are similar to the first feature image, retrain the contrastive learning model based on an updated set of feature images comprising the first feature image;

receive a first set of feature images;

train the contrastive learning model based on the first set of feature images such that the contrastive learning model, g(a,b), outputs a similarity value indicating a similarity between a pair of feature images, a and b; and for each feature image in the first set of feature images, calculate a novelty level for the feature image based on the similarity values, the novelty level for the feature indicating the dissimilarity of the feature image to all other feature images in the first set of feature images.

12. A mapping node for enabling determination of a position of a mobile device in an environment, the mapping node comprising:

processing circuitry configured to cause the mapping node to:

obtain a set of landmark feature images for use in determining positions of wireless devices in the environment, the set of landmark feature images being obtained using a contrastive learning model trained based on a first set of feature images and the obtaining the set of landmark feature images further comprising:

receiving a first set of training images from one or more mobile devices;

deriving a first set of feature images from the first set of training images; and obtaining novelty levels for each of the first set of feature images, the novelty levels indicative of the similarity of each feature image in the first set of feature images to the other feature images in the first set of feature images, the novelty levels received from a contrastive learning node; and responsive to obtaining an indication that none of the set of landmark features images are similar to a first feature image derived from a first image captured by the mobile device, initiate retraining of the contrastive learning model based on an updated set of feature images comprising the first feature image.

* * * * *